United States Patent
Mascioli et al.

(10) Patent No.: US 9,692,320 B2
(45) Date of Patent: Jun. 27, 2017

(54) ADAPTIVE CONTROL METHOD FOR GRID-CONNECTED INVERTERS USED WITH DISTRIBUTED POWER GENERATION

(71) Applicant: Sparq Systems Inc., Kingston (CA)

(72) Inventors: Matthew Lorenzo Mascioli, Marina del Rey, CA (US); Majid Pahlevaninezhad, Kingston (CA); Suzan Eren, Kingston (CA); Praveen Jain, Kingston (CA)

(73) Assignee: SPARQ SYSTEMS INC., Kingston (CA)

( * ) Notice: Subject to any disclaimer, the term of this patent is extended or adjusted under 35 U.S.C. 154(b) by 26 days.

(21) Appl. No.: 14/745,043

(22) Filed: Jun. 19, 2015

(65) Prior Publication Data

US 2016/0373025 A1 Dec. 22, 2016

(51) Int. Cl.
*H02M 7/537* (2006.01)
*H02M 7/538* (2007.01)
*H02M 7/53* (2006.01)
*H02M 1/12* (2006.01)
*H02M 7/5387* (2007.01)
*H02J 3/38* (2006.01)

(52) U.S. Cl.
CPC .............. *H02M 7/537* (2013.01); *H02J 3/383* (2013.01); *H02M 1/12* (2013.01); *H02M 7/53* (2013.01); *H02M 7/538* (2013.01); *H02M 7/53871* (2013.01)

(58) Field of Classification Search
CPC ....................................................... H02M 7/537
USPC ............................................................ 363/97
See application file for complete search history.

(56) References Cited

U.S. PATENT DOCUMENTS

| | | | | |
|---|---|---|---|---|
| 2003/0071588 A1* | 4/2003 | Iwaji | ......................... | H02P 6/12 318/400.01 |
| 2010/0254172 A1* | 10/2010 | Hattori | .............. | H02M 7/53871 363/132 |
| 2011/0222326 A1* | 9/2011 | Gray | ................. | H02M 7/53875 363/132 |
| 2012/0229063 A1* | 9/2012 | Yokokawa | ................ | H02P 9/48 318/400.07 |
| 2012/0306408 A1* | 12/2012 | Chung | ............... | G01R 31/2849 315/307 |
| 2014/0265962 A1* | 9/2014 | Gebregergis | ........... | B62D 5/046 318/400.23 |

* cited by examiner

*Primary Examiner* — Jue Zhang
*Assistant Examiner* — Trinh Dang
(74) *Attorney, Agent, or Firm* — Brion Raffoul

(57) ABSTRACT

Systems, methods, and devices relating to control systems for grid-connected inverters. Because grid conditions may vary and because control system stability is dependent on the parameters of the components within the inverter, the present invention adaptably monitors the varying values of these components. Based on the sensed values and on predicted values, controller gains are adaptably adjusted to maintain system stability.

12 Claims, 27 Drawing Sheets

ADAPTIVE CONTROL METHOD FOR GRID-CONNECTED INVERTERS USED WITH DISTRIBUTED POWER GENERATION

TECHNICAL FIELD

The present invention relates to power electronics. More specifically, the present invention relates to systems and methods for maintaining the stability of a control system for a power grid connected inverter.

BACKGROUND OF THE INVENTION

Distributed Generation (DG) systems are commonly fed by renewable energy sources such as wind or PV (photo-voltaic) technology. In all grid-connected DG systems, a conversion between DC and AC power is performed by an inverter system. In the case of wind energy, AC power is generated by a rotating turbine which is rectified to DC power by a front-end converter as depicted by FIG. 1. PV energy, or more commonly referred to as solar power, is generated by light contacting an array of photo-sensitive diodes which develops a DC voltage across the device and current through the device upon circuit completion. It can be seen in FIG. 2 that the developed power undergoes a DC/DC conversion by the front-end converter to meet the DC power requirements of the second stage converter. In both cases of wind and PV generators, the front-end converter is responsible for the extraction of maximum-power from the volatile energy sources. The grid-connected converter in both systems is responsible for the conversion of DC power into AC power which meets the interconnection quality standards of the region.

The inverter is the interface between any renewable energy source and the electricity grid. The inverter is composed of many different systems which are designed to ensure that the quality of the electric current leaving the inverter is compliant with the interconnection standard (e.g., IEEE1547). The conventional grid-connected DC/AC system is composed of a synchronizer, a current controller, and a DC-bus regulator. The interconnection of these systems is shown in FIG. 3. The synchronizer generates the sinusoidal current reference which is required to be free of distortions and to be phase-locked to the electricity grid voltage phase. The current controller assures that the current injected into the grid is in-phase with the reference signal and that harmonic content is at a minimum. The DC-bus regulator adjusts the magnitude of the current reference signal in order to maintain the voltage in a safe operating region.

The critical component to the DC/AC converter is the current control loop responsible for the fast and accurate tracking of the reference signal. A sinusoidal signal is not easily tracked by linear systems particularly when higher order output filters are implemented. Such filters also tend to be susceptible to resonant excitation and require special attention to prevent such instabilities. Typically, a state-feedback loop is implemented to promote stability. Another requirement of the current controller is that it should reject harmonic content which occurs due to switching device non-linearities or unintentional reference noise.

The basic requirement for a current controller is the ability to track a sinusoidal reference. The introduction of LCL-filters, a third-order system with a resonance peak, poses challenges in terms of closed-loop control system stability. The LCL-filter is described as a linear forced oscillation system: the controller is forcing the system to resonate at the grid frequency but the system will always tend to resonate at its natural frequency. FIG. 4 shows the grid connected DC/AC inverter with an LCL-filter.

FIG. 5 shows the block diagram of the closed-loop current control system for a grid-connected DC/AC inverter with an LCL-filter according to the prior art. According to FIG. 5, the current control loop includes Proportional Resonant (PR)-controllers along with a linear state-feedback controller. The resonant controllers are responsible for the sinusoidal reference tracking of the grid current as well as for eliminating the current harmonics by providing very high loop gains at the harmonic frequencies. The linear state-feedback guarantees the stability of the closed-loop control system by placing the closed-loop poles on the left-half plane.

The main difficulty with the current controller shown in FIG. 5 is that the closed-loop system is only stable for nominal values of the system parameters. If the parameters vary, the stability of the current control loop might be jeopardised. The state-feedback gains are designed based on the values of the components of the LCL-filter and these values are subject to change based on operating conditions and grid impedance. In addition, if the grid frequency changes, the PR-controller is unable to perform perfect tracking of the sinusoidal reference signal. As distributed power generators become more prevalent and conventional energy sources are replaced with renewable energy sources, grid conditions become more volatile and grid impedance can change significantly. Because of this, the current controller in grid-connected inverters should be able to maintain stability despite variations in grid conditions.

SUMMARY OF INVENTION

The present invention provides systems, methods, and devices relating to control systems for grid-connected inverters. Because grid conditions may vary and because control system stability is dependent on the parameters of the components within the inverter, the present invention adaptably monitors the varying values of these components. Based on the sensed values and on predicted values, controller gains are adaptably adjusted to maintain system stability.

The present invention proposes an adaptive control method, which is able adaptively adjust the controller gains such that the closed-loop control system maintain stability against parameters variations and parameter uncertainties.

In a first aspect, the present invention provides a control system for controlling an inverter, the system comprising:
- a parameter identification block for receiving sensed signal values from an inverter and for estimating values for components within said inverter based on said sensed signal values;
- a current controller block for receiving a reference current signal and an estimated frequency value and for determining a desired gain for said inverter;
- wherein
- said desired gain enhances a stability of said control system;
- said inverter comprises an LCL filter, said values for said components comprising values for inductors and capacitors in said LCL filter.

In a second aspect, the present invention provides a method for enhancing a stability of a control system for an inverter, the method comprising:
a) receiving sensed values from said inverter;
b) estimating parameters for components in said inverter based on said sensed values;

c) estimating an estimated frequency for a grid to which said inverter is coupled;

d) adjusting a gain of said inverter based on said estimated frequency and said parameters estimated in step b).

In a third aspect, the present invention provides non-transitory computer readable media having encoded thereon computer readable instructions which, when executed, implements a method for enhancing a stability of a control system for an inverter, the method comprising:

a) receiving sensed values from said inverter;

b) estimating parameters for components in said inverter based on said sensed values;

c) estimating an estimated frequency for a grid to which said inverter is coupled;

d) adjusting a gain of said inverter based on said estimated frequency and said parameters estimated in step b).

BRIEF DESCRIPTION OF THE DRAWINGS

The embodiments of the present invention will now be described by reference to the following figures, in which identical reference numerals in different figures indicate identical elements and in which.

DETAILED DESCRIPTION

The stable operation of the inverter requires that two main objectives be met. The first objective is the accurate tracking of the current reference signal ($i_{ref}$) by the grid current ($i_{grid}$). The second objective is the regulation of the DC-bus voltage ($V_{DC}$) within a safe range of operation.

Figure 1:
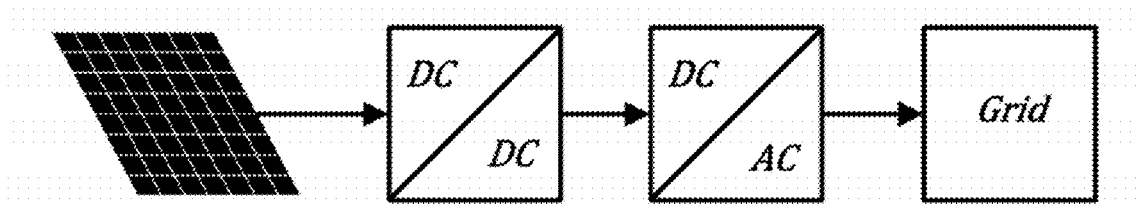
FIG. 1 is a diagram illustrating a wind power generator and how it can be coupled to a power grid.
Figure 2:
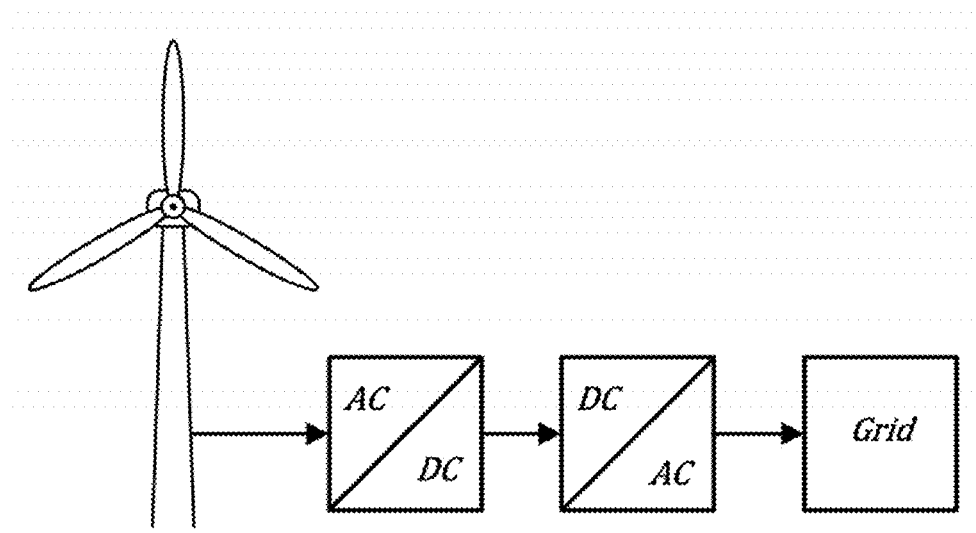
FIG. 2 illustrates how the power from a distributed power generation source can be converted for use with a power grid.
Figure 3:
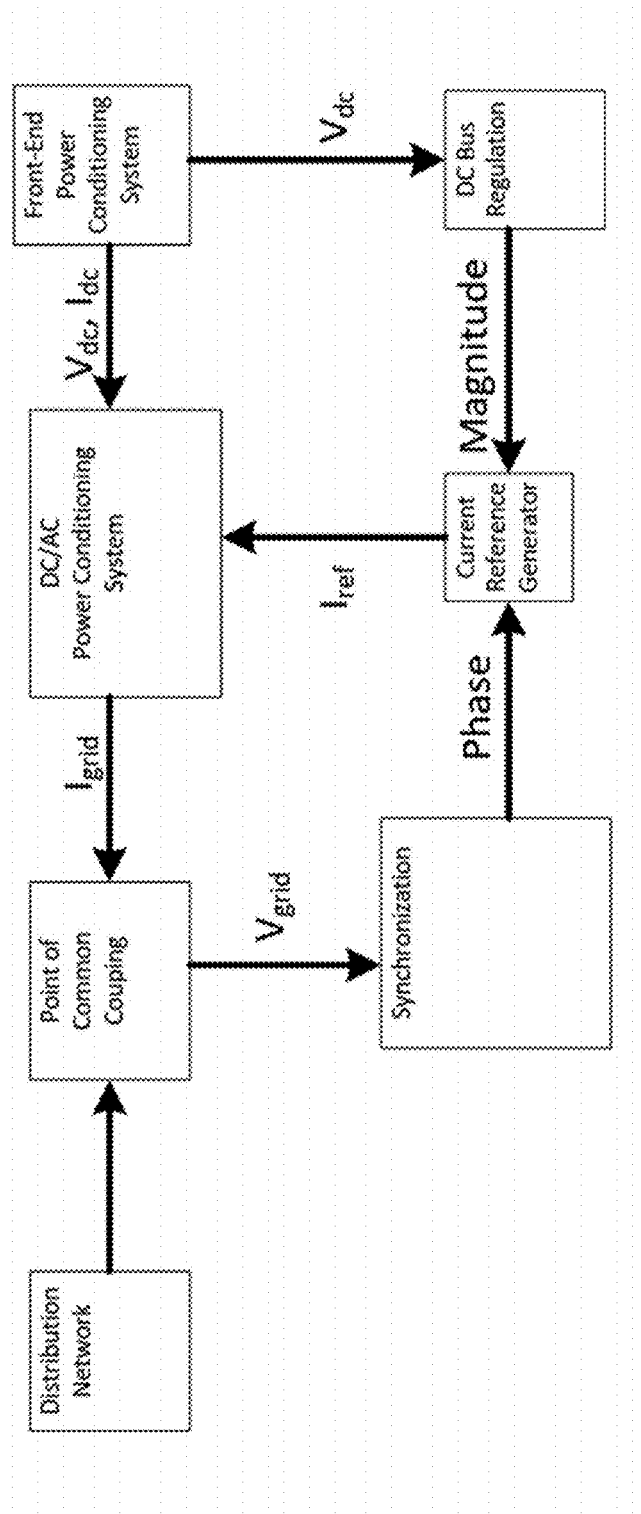
FIG. 3 illustrates the interconnection of a conventional grid-connected DC/AC system.
Figure 4:
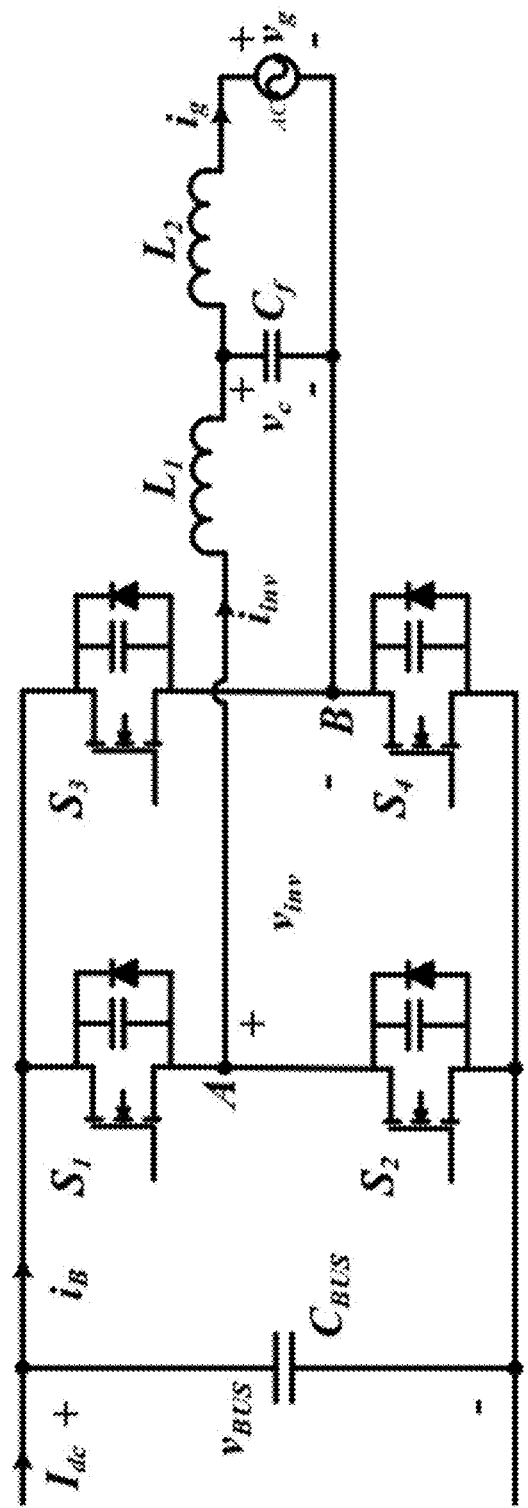
FIG. 4 is a block diagram of a grid-connected DC/AC inverter with an LCL-filter.
Figure 5:
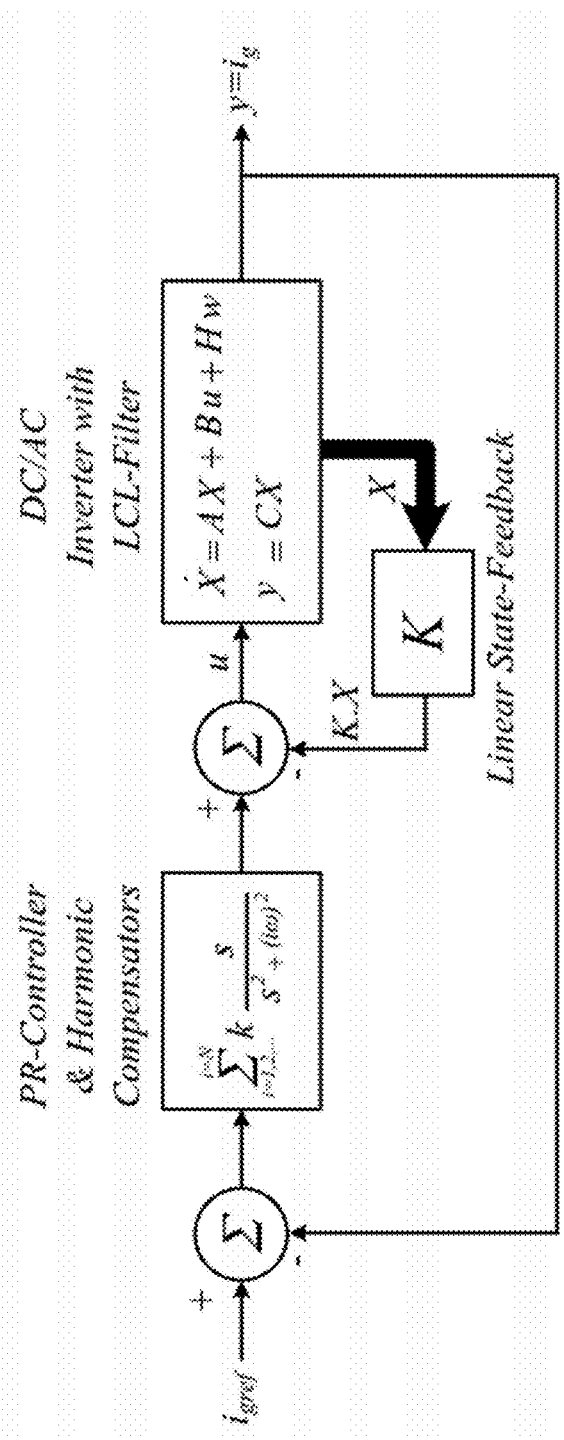
FIG. 5 is a block diagram of a closed loop current control system according to the prior art and detailing the transfer functions for such a control system.
Figure 6:
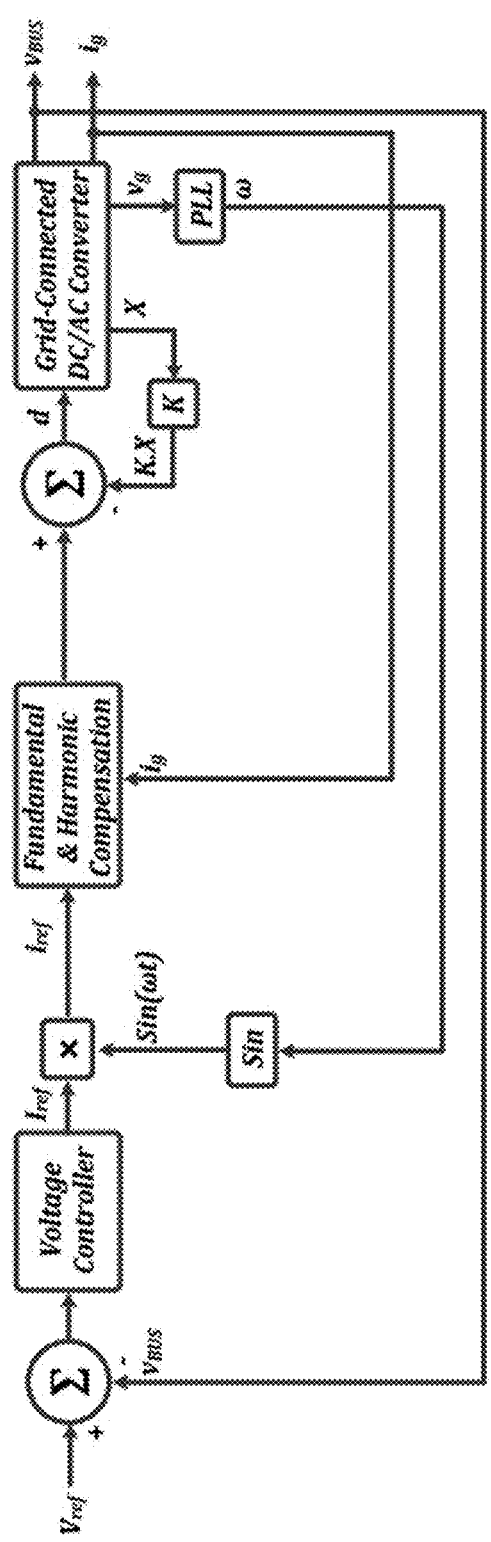
FIG. 6 is a general block diagram of an inverter closed loop control system detailing the components of such a system.

FIG. 6 shows the general block diagram of the inverter closed-loop control system. According to this diagram, the closed-loop control system includes an external voltage loop, which is responsible for the regulation of the DC-bus voltage, and an internal current loop, which is responsible for the injection of a high quality current to the utility grid. In particular, the internal current loop should maintain stability of the closed-loop control system against the resonance created by the LCL-filter. Therefore, the state-feedback K·X is designed such that the internal current loop is stable. The state-feedback K·X is designed based on the inverter parameters (e.g. the parameters of the components of the inverter as shown in FIG. 5, $L_1$, $L_2$, $C_f$). The parameters of the inverter determine the stability of the closed-loop control system. These parameters can vary widely and can potentially lead to instabilities or undesirable performance. The variation in parameter values can alter the system response to disturbances away from a desired profile or can move the system into instability altogether. The three components which influence the stability are the inverter-side inductance ($L_1$), the grid-side inductance ($L_2$), and the filter capacitance ($C_f$). The equations governing the system is described by the state-space equations.

$$\dot{x} = AX + Bu + W \quad (1)$$

$$X = \begin{bmatrix} i_{inv} \\ v_{cap} \\ i_{grid} \end{bmatrix} \quad (2)$$

$$A = \begin{bmatrix} -R_1/L_1 & -1/L_1 & 0 \\ 1/C_f & 0 & -1/C_f \\ 0 & 1/L_2 & -R_2/L_2 \end{bmatrix} \quad (3)$$

$$B = \begin{bmatrix} 1/L_1 \\ 0 \\ 0 \end{bmatrix} \quad (4)$$

where $R_1$ and $R_2$ are the equivalent resistances of the inductor $L_1$ and inductor $L_2$ respectively.

The pole locations of the closed-loop system are found by taking the determinant of the matrix sI–(A–BK) of the closed-loop system dynamics as follows:

$$\det(sI - (A - BK)) = \frac{R_1 + R_2 + k_1 + k_3 + R_2k_2 + s(L_1 + L_2 + L_2k_2)}{C_f L_1 L_2} + \frac{s(R_2 + sL_2)(R_1 + k_1 + sL_1)}{L_1 L_2} \quad (5)$$

Figure 7:
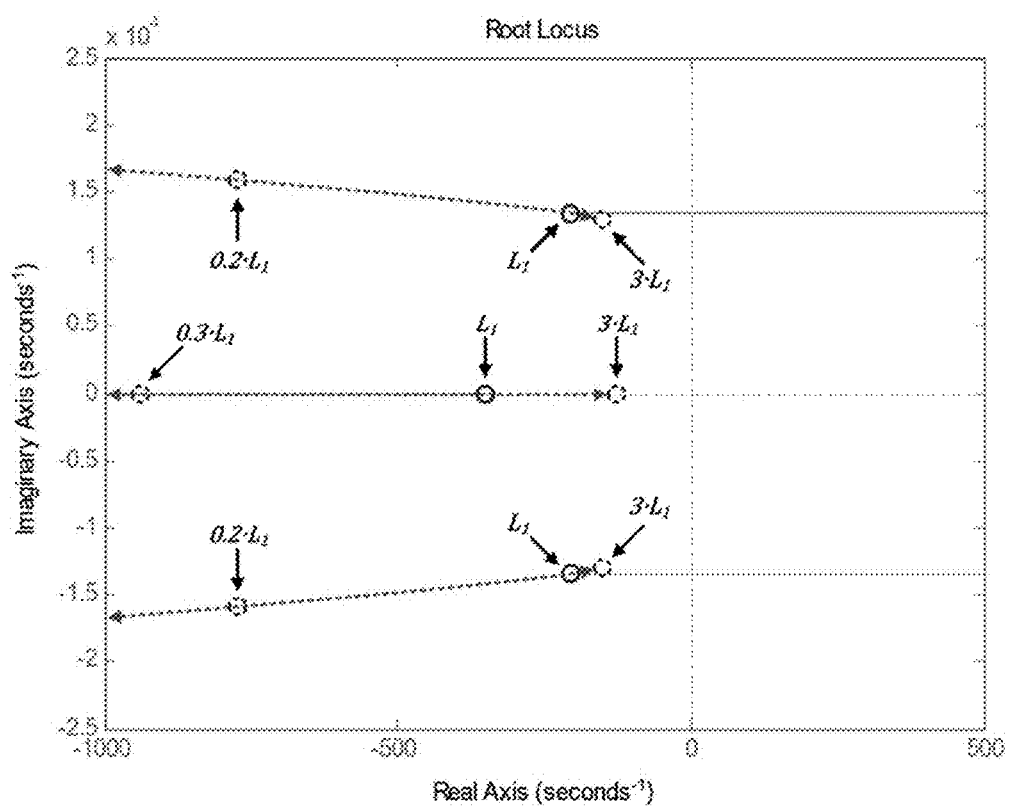
FIG. 7 illustrates the effect on pole placement by changes in the inductance of the inverter side inductor.

The locations of the closed-loop poles determine the stability of the closed-loop control system. The movement of the poles due to the inductance of the inverter-side inductor ($L_1$) is shown in FIG. 7. As the inductance value increases, the poles of the system move toward the imaginary axis, thereby bringing a more oscillatory response. However, a decrease in the inductance value prompts a much more severe movement away from the imaginary axis, suggesting a severe over-damped behaviour.

Figure 8:
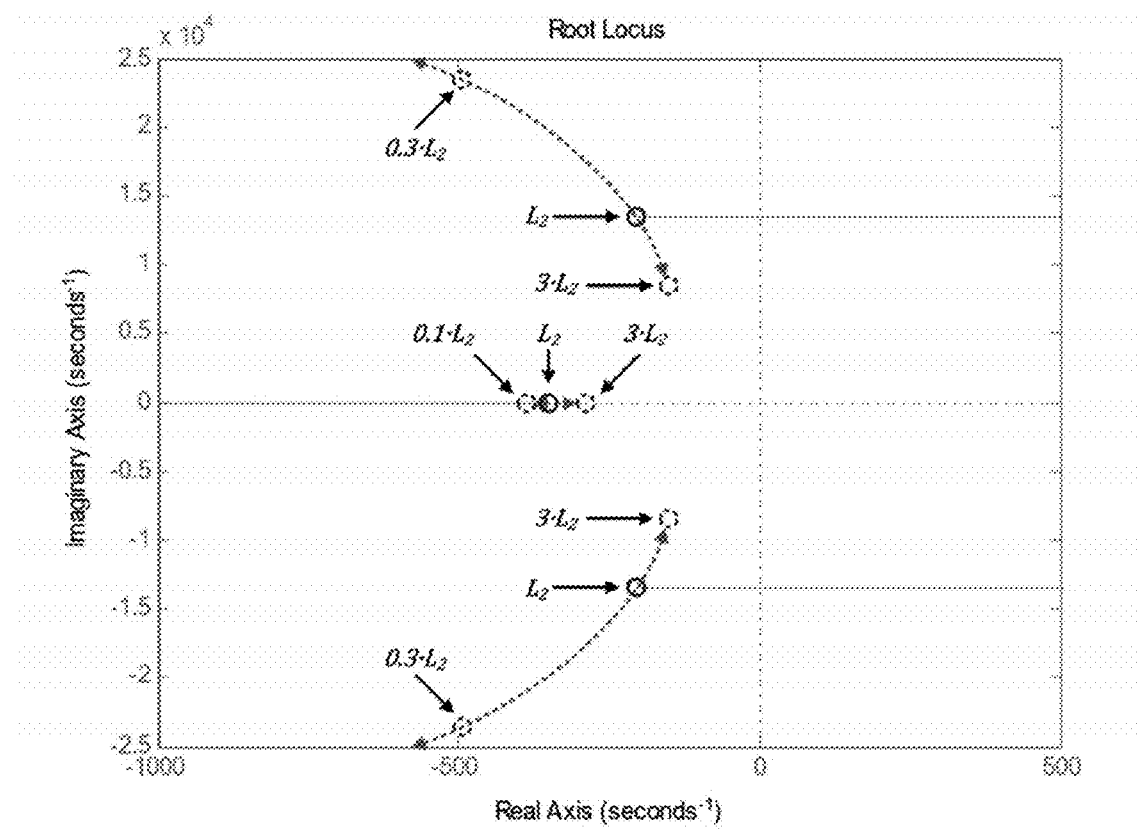
FIG. 8 illustrates the effect on pole placement by changes in the inductance of the grid side inductor.

FIG. 8 shows that changes in the inductance of the grid-side inductor ($L_2$) has effects on pole placements similar to that for the inverter-side inductor. An increase in inductance moves the poles towards the imaginary axis and towards instability, while a decrease prompts a retreat from the imaginary axis.

Figure 9:
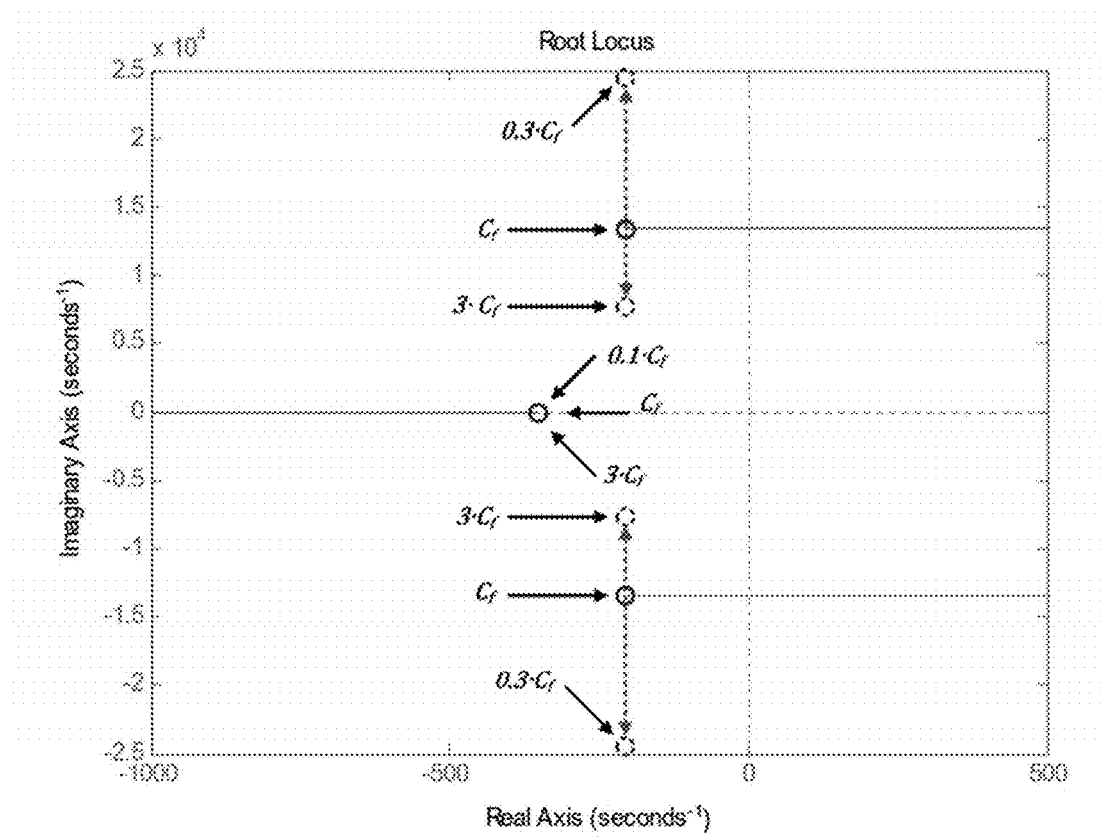
FIG. 9 illustrates the effect on pole placement by changes in the capacitance value of the filter capacitor.

The impact of changes in the filter capacitance ($C_f$) on pole placement is presented in FIG. 9. The two imaginary poles move closer to the real axis with an increasing capacitance and away from the real axis with a capacitance decrease. The pole positioned on the real-axis is not affected by changes in the capacitance value. No real impact on stability is seen by adjusting the capacitance.

FIG. 7, FIG. 8, and FIG. 9 show that the values of the system parameters has a great impact on the stability margins of the system. Therefore, variations in any of these parameters may jeopardise the stability of the closed-loop control system and may influence the performance of the inverter.

Figure 10:
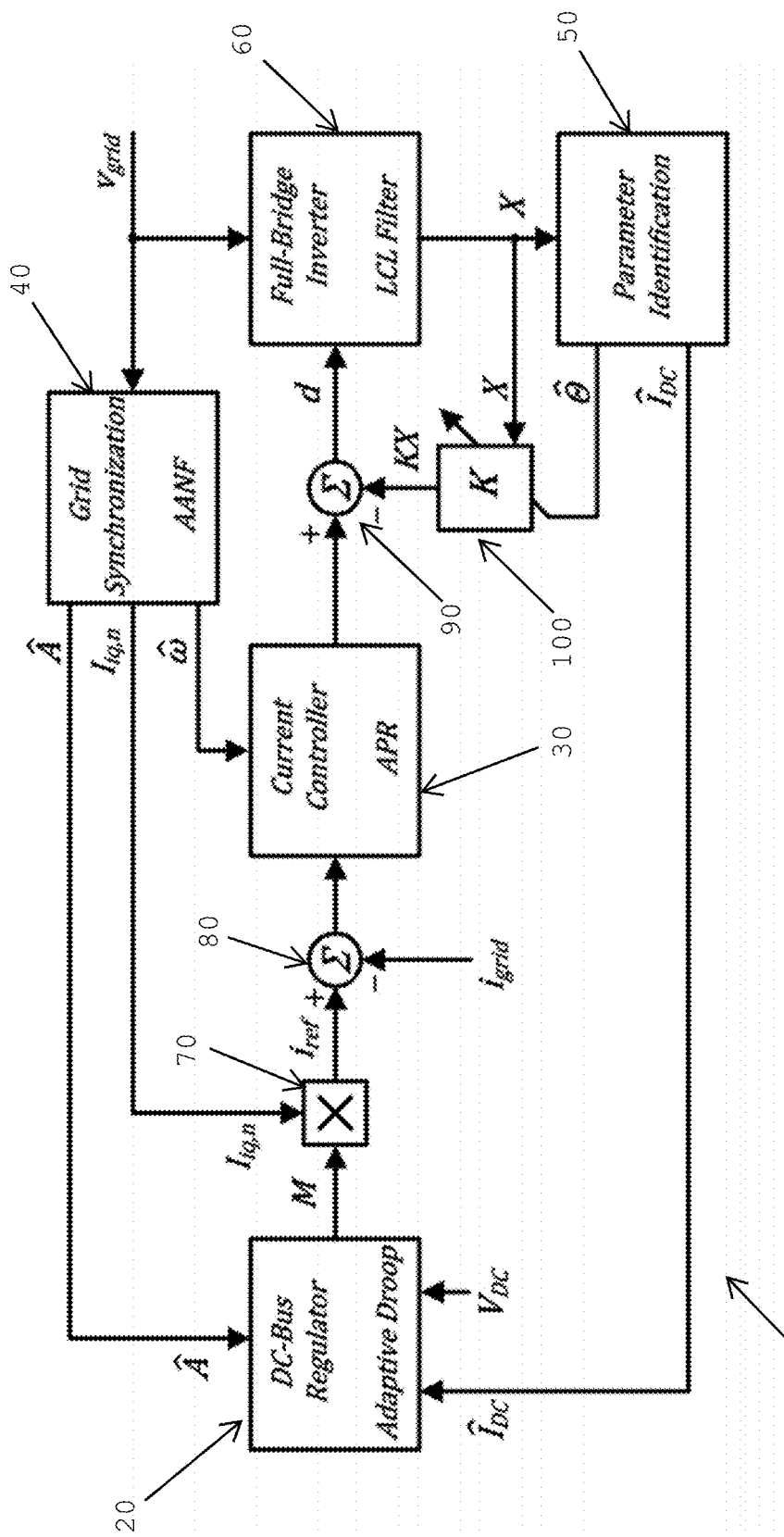
FIG. 10 is a block diagram of a closed loop inverter controller according to one aspect of the invention.

In one aspect, the present invention provides a closed-loop controller which is able to adaptively track the changes in the parameters and is able to change the controller gains in order to compensate for parameter variations. FIG. 10 shows the adaptive control system for the grid-connected inverter according to one aspect of the invention. The control system 10 includes a DC-bus regulator block 20, a current controller block 30, a grid synchronization block 40, and a parameter identification block 50. The control system 10 receives input from a full-bridge inverter with LCL-filter 60.

As can be seen from FIG. 10, the grid voltage $v_{grid}$, is fed to the full bridge inverter block 60 and the grid synchronization block 40. The grid frequency estimate ($\hat{\omega}$) is received from the grid synchronization block 40 by the current controller block 30. An estimate of the magnitude of the sinusoidal reference current ($\hat{A}$) is received from the grid synchronization block 40 (equipped with an amplitude adaptive notch filter (AANF) which can estimate the amplitude of an input signal) by the DC-bus regulator block 20 while the reference current signal $I_{iq,n}$ (synchronized to the grid current) is also produced by the grid synchronization block 40. This reference current signal is multiplied by a magnitude M generated by the DC-bus regulator block 20 using multiplier block 70. The result is the current reference signal $i_{ref}$. Summation block 80 then subtracts the grid current $i_{grid}$ from this current reference signal $i_{ref}$. The result is then received by the current controller block 30. The difference (taken by summation block 90) between the output of the current controller block 30 and the state feedback K·X (from multiplier block 100) is the duty cycle d fed to the inverter block 60. The inverter block sends sensed inverter values K (see below) to the parameter identification block 50. The parameter identification block 50 then estimates the inverter parameters $\hat{\Theta}$ as well as the input DC current $\hat{I}_{DC}$. The input DC current is sent to the DC-bus regulator along with the input DC voltage $V_{DC}$.

It should be noted that while the diagrams illustrate a full inverter circuit, the present invention will also work with a half-inverter circuit. For such an implementation, the gain of the control input will be half of the gain for a full inverter implementation.

In the present invention, an identification method is used to estimate the different parameters of the inverter and to track the changes in the system parameters. In particular, the two inductances ($L_1$, $L_2$), the filter capacitance ($C_f$) and the DC current coming from the first stage $I_{DC}$ are estimated by the identification method used by the parameter identification block 50. The method is constructed based on adaptive estimation and persistency of excitation. For the system according to one aspect of the invention, the grid voltage ($v_{grid}$) provides a continual disturbance, forcing the operating conditions to change. Therefore, convergence of the system is possible by using the persistency of excitation.

The design procedure of the identification method is based on the mathematical model of the inverter. The model of the inverter includes the following measured states (X) given by equation (6). The basis of the model, the dynamics of the inverter, can then be written as equation (7) which, in turn, yields the state-space equations governing the inverter model.

$$X = \begin{bmatrix} x_1 \\ x_2 \\ x_3 \\ x_4 \end{bmatrix} = \begin{bmatrix} v_{DC} \\ i_{inv} \\ v_{cap} \\ i_{grid} \end{bmatrix} \quad (6)$$

$$\dot{x}_1 = I_{DC} - \frac{1}{C_{BUS}} u x_2 \quad (7)$$

$$\dot{x}_2 = \frac{1}{L_1} x_1 u - \frac{R_1}{L_1} x_2 - \frac{1}{L_1} x_3$$

$$\dot{x}_3 = \frac{1}{C_f} x_2 - \frac{1}{C_f} x_4$$

$$\dot{x}_4 = \frac{1}{L_3} x_3 - \frac{R_2}{L_2} x_4 - \frac{1}{L_2} v_{grid}$$

The model contains desired parameters $L_1$, $C_f$, and $L_2$ under identification but also the input DC current ($I_{DC}$) from an input stage power converter (source), for which there is not a measurement sensor. Therefore, an estimator will be created for the state. Parameters $R_1$ and $R_2$ are assumed to be predetermined constants. The parameters subject to identification are arranged in $\Theta$ as shown in equation (8).

$$\Theta = \begin{bmatrix} \theta_1 \\ \theta_2 \\ \theta_3 \\ \theta_4 \end{bmatrix} = \begin{bmatrix} I_{DC} \\ \frac{1}{L_1} \\ \frac{1}{L_2} \\ \frac{1}{C_f} \end{bmatrix} \quad (8)$$

The design of the observer system is based upon the inverter's mathematical model accompanied by a nonlinear correction term. Using equation (7) as a basis, a substitution of measured states for the observer equivalent (x→x̂) or estimator equivalent (equation (8)) yields the observer dynamics given by equation (9). Additionally, a non-linear correction term represented by ζ is applied.

$$\dot{\hat{x}}_1 = \hat{\theta}_1 - \frac{1}{C_{bus}}\hat{x}_2 u + \zeta_1(h,u)(x_1 - \hat{x}_1)$$

$$\dot{\hat{x}}_2 = \hat{\theta}_2 \hat{x}_1 u - R_1 \hat{\theta}_2 \hat{x}_2 - \hat{\theta}_2 \hat{x}_3 + \zeta_2(h,u)(x_2 - \hat{x}_2)$$

$$\dot{\hat{x}}_3 = \hat{\theta}_4 \hat{x}_2 - \hat{\theta}_4 \hat{x}_4 + \zeta_3(h,u)(x_3 - \hat{x}_3)$$

$$\dot{\hat{x}}_4 = \hat{\theta}_3 \hat{x}_3 - R_2 \hat{\theta}_3 \hat{x}_4 - \hat{\theta}_3 v_{grid} + \zeta_4(h,u)(x_4 - \hat{x}_4) \quad (9)$$

The nonlinear correction terms given by $\zeta_n(h,u)(x_n - \hat{x}_n)$ can be simplified by rewriting the disagreement between the measured state and the observer state as the estimation error, $\tilde{x}_n$.

$$\tilde{X} = \begin{bmatrix} \tilde{x}_1 \\ \tilde{x}_2 \\ \tilde{x}_3 \\ \tilde{x}_4 \end{bmatrix} = \begin{bmatrix} x_1 - \hat{x}_1 \\ x_2 - \hat{x}_2 \\ x_3 - \hat{x}_3 \\ x_4 - \hat{x}_4 \end{bmatrix} \quad (10)$$

By taking the difference between the inverter model dynamics (Ẋ) and the observer dynamics (X̂), the observer error dynamics ($\dot{\tilde{X}}$) can be obtained.

$$\dot{\tilde{x}}_1 = \tilde{\theta}_1 - \frac{1}{C_{bus}}\tilde{x}_2 u - \zeta_1(h,u)\tilde{x}_1$$

$$\dot{\tilde{x}}_2 = \tilde{\theta}_2 \tilde{x}_1 u - R_1 \tilde{\theta}_2 \tilde{x}_2 - \tilde{\theta}_2 \tilde{x}_3 - \zeta_2(h,u)\tilde{x}_2$$

$$\dot{\tilde{x}}_3 = \tilde{\theta}_4 \tilde{x}_2 - \tilde{\theta}_4 \tilde{x}_4 - \zeta_3(h,u)\tilde{x}_3$$

$$\dot{\tilde{x}}_4 = \tilde{\theta}_3 \tilde{x}_3 - R_2 \tilde{\theta}_3 \tilde{x}_4 - \tilde{\theta}_3 v_{grid} - \zeta_4(h,u)\tilde{x}_4 \quad (11)$$

The error dynamics given by equation (11) must be asymptotically stable in order to guarantee convergence of the estimation error to zero. The use of the following Lyapunov function based on the estimation errors fits this requirement. The derivative of the Lyapunov function creates a negative, semi-definite trajectory for the derivative which equates to a convergent system.

$$V = \frac{\tilde{x}_1^2}{2} + \frac{\tilde{x}_2^2}{2} + \frac{\tilde{x}_3^2}{2} + \frac{\tilde{x}_4^2}{2} + \frac{\tilde{\theta}_1^2}{2\mu_1} + \frac{\tilde{\theta}_2^2}{2\mu_2} + \frac{\tilde{\theta}_3^2}{2\mu_3} + \frac{\tilde{\theta}_4^2}{2\mu_4} \quad (12)$$

The derivative of the Lyapunov function creates a negative, semi-definite trajectory for the derivative which equates to a convergent, asymptotically stable system. It is derived as:

$$\dot{V} = \dot{\tilde{x}}_1 \tilde{x}_1 + \dot{\tilde{x}}_2 \tilde{x}_2 + \dot{\tilde{x}}_3 \tilde{x}_3 + \dot{\tilde{x}}_4 \tilde{x}_4 + \frac{\dot{\tilde{\theta}}_1 \tilde{\theta}_1}{\mu_1} + \frac{\dot{\tilde{\theta}}_2 \tilde{\theta}_2}{\mu_2} + \frac{\dot{\tilde{\theta}}_3 \tilde{\theta}_3}{\mu_3} + \frac{\dot{\tilde{\theta}}_4 \tilde{\theta}_4}{\mu_4} \quad (13)$$

Based on the derivative of the Lyapunov function, the adaptive laws used to estimate the parameters in Θ are constructed by substituting in the observer error dynamics given by equation (11) into $\dot{V}$. Then, the objective becomes one of finding combinations of the parameter error dynamics which drives $\dot{V}$ to 0. When $\dot{V} \to 0$, this indicates V is no longer changing as system convergence has been achieved. The adaptive parameter update laws which achieve this are defined in equation (14).

$$\dot{\tilde{\theta}}_1 = -\mu_1 \tilde{x}_1$$

$$\dot{\tilde{\theta}}_2 = -\mu_2 \tilde{x}_2 (x_1 u - x_3)$$

$$\dot{\tilde{\theta}}_3 = -\mu_3 \tilde{x}_4 (x_3 - v_{grid})$$

$$\dot{\tilde{\theta}}_4 = -\mu_4 \tilde{x}_3 (x_2 - x_4) \quad (14)$$

Finally, the parameter estimates can be extracted from the error dynamics given by equation (14). This is done by applying the negative-integral to the equations in (14).

$$\tilde{\theta} = \theta - \hat{\theta}$$

$$\dot{\tilde{\theta}} = 0 - \dot{\hat{\theta}}$$

$$\dot{\tilde{\theta}} = -\dot{\hat{\theta}}$$

From this, the non-linear adaptive parameter observers for $L_1$, $L_2$, $C_f$ and the state variable, $I_{dc}$ are given by equation (15).

$$\dot{\hat{\theta}}_1 = \mu_1 \tilde{x}_1$$

$$\dot{\hat{\theta}}_2 = \mu_2 \tilde{x}_2 (x_1 u - x_3)$$

$$\dot{\hat{\theta}}_3 = \mu_3 \tilde{x}_4 (x_3 - v_{grid})$$

$$\dot{\hat{\theta}}_4 = \mu_4 \tilde{x}_3 (x_2 - x_4) \quad (15)$$

For greater clarity, it should be noted that the values for $\mu_1$, $\mu_2$, $\mu_3$, and $\mu_4$ are arbitrary positive values which determine the speed of the parameter's convergence.

The "Parameter Identification" block in FIG. 10 is implemented based on (15). This block updates the parameter for different blocks in the closed-loop control system in order to maintain the closed-loop stability and to improve the performance of the closed-loop control system.

According to FIG. 10, the state-feedback design adjusts the gains according to the estimated inductance and capacitance values of the output filter. The objective of the adaptive feedback is to modify the pole placement of the closed-loop system to a predetermined region of the complex plane according to the estimated filter parameters. This action would preserve a prescribed performance profile of the converter across a broad range of parameter variations.

Figure 11:
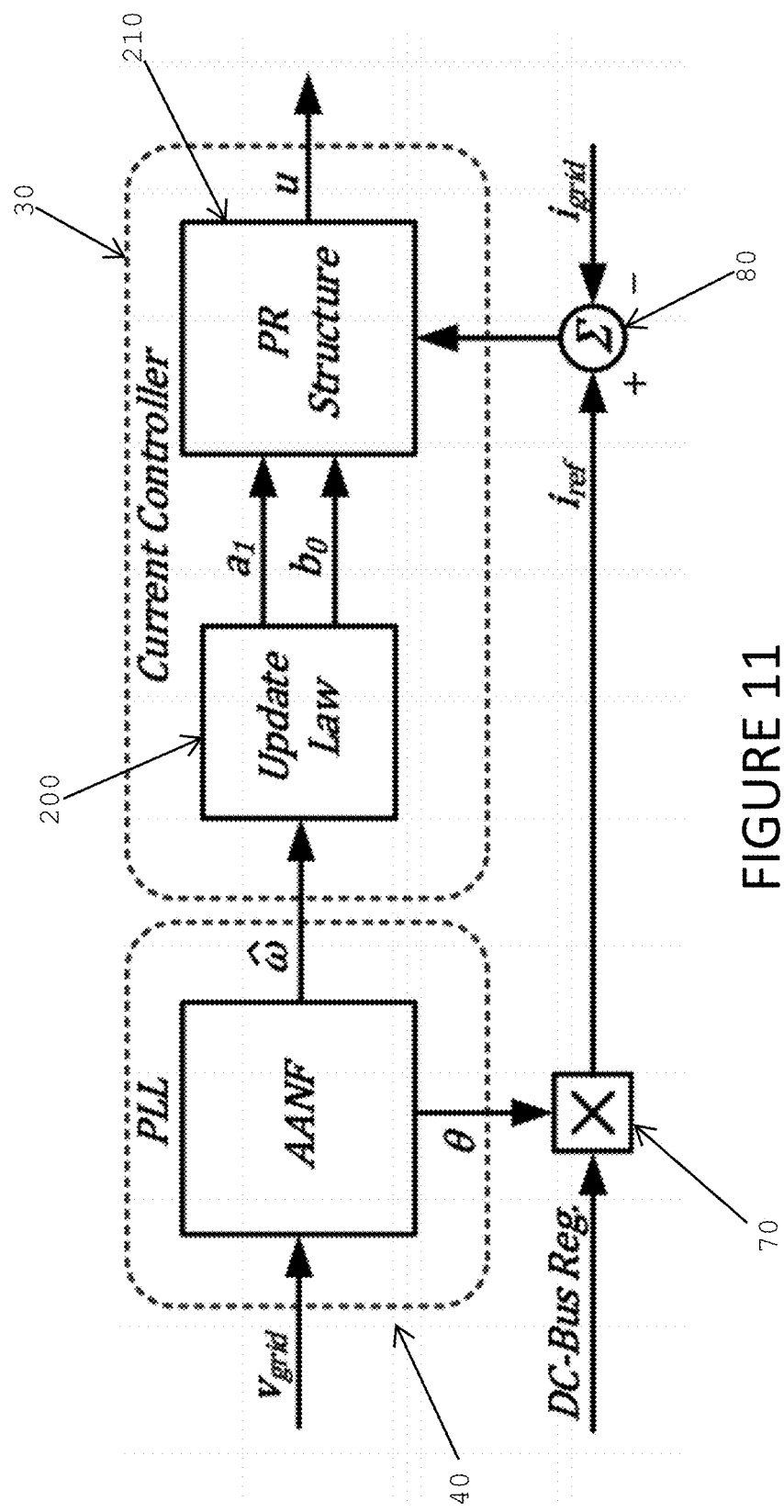
FIG. 11 is a block diagram of an adaptive proportional resonant current controller according to one aspect of the invention.

The Adaptive Proportional Resonant (APR) current controller block in FIG. 10 incorporates the frequency estimate ($\hat{\omega}$) to accurately tune the resonant frequency of the resonant controller. Dynamically returning the resonant frequencies of the error and harmonic compensator ensures $i_{ref}$ is accurately tracked by $i_{grid}$ for nearly perfect tracking and harmonics suppression. FIG. 11 shows the APR current controller.

Referring to FIG. 11, it can be seen that the current reference $i_{ref}$ is produced by the multiplier block 70 after the reference sinusoidal waveform (phase synchronized with the grid current) is received from the grid synchronization block 40 and multiplied by a magnitude factor M from the DC-bus regulator block. The current controller block 30 receives the estimated frequency ($\hat{\omega}$) from the same grid synchronization block 40. Since the current controller 30 adapts to the changing conditions of the system, the update law block 200 provides the coefficients ($a_1$, $b_0$) necessary to adapt to the estimated frequency ($\hat{\omega}$). These coefficients are then sent to the Proportional Resonant (PR) structure block 210 to produce the output of the current controller block 30. In conjunction with the state feedback K·X, this output controls the gain of the inverter system to thereby compensate for any changes in inverter parameters.

Figure 12:
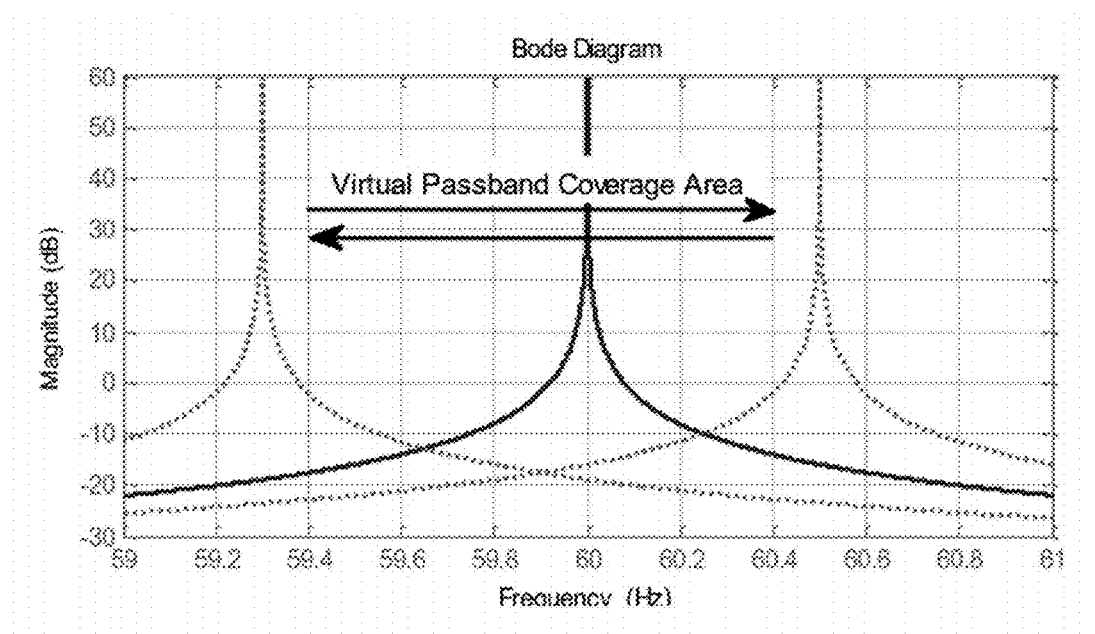
FIG. 12 illustrates a virtual wideband created when the resonant frequency of the compensator is moved.
Figure 13:
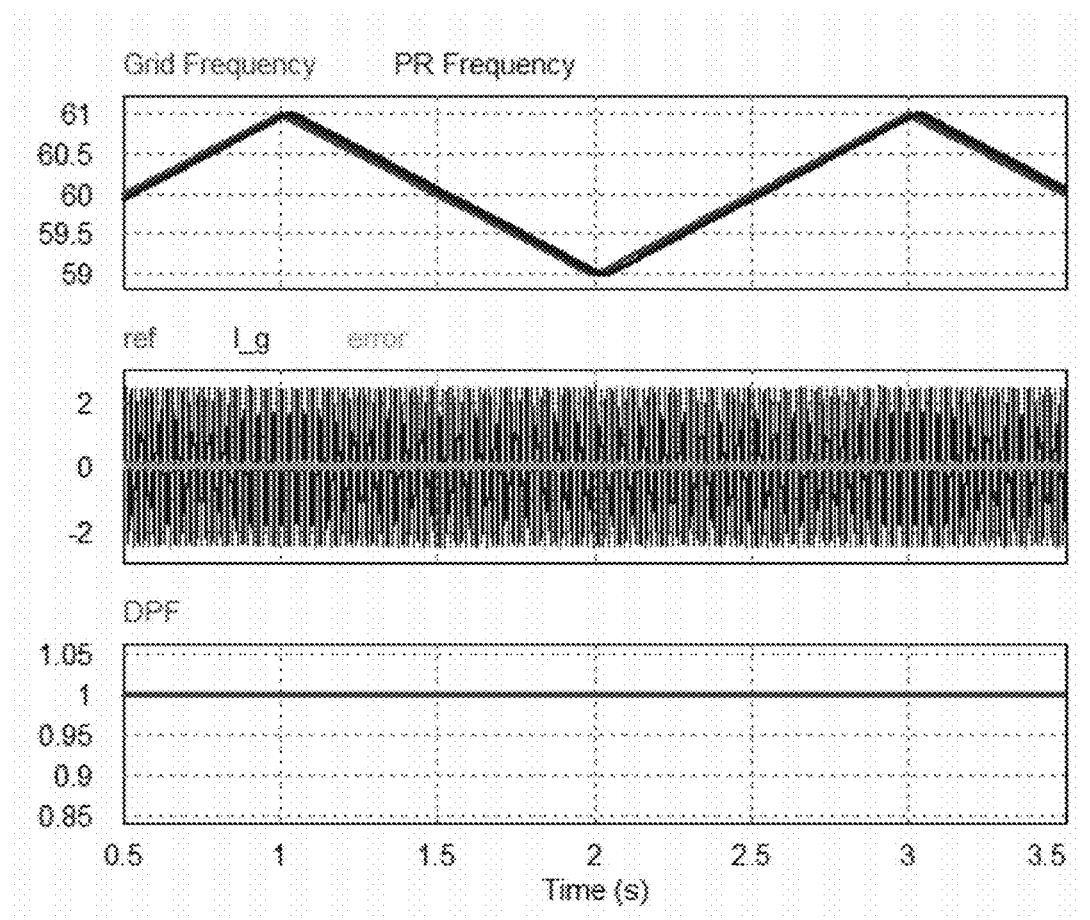
FIG. 13 illustrates the result when the grid current reference signal is accurately tracked throughout the frequency range.

In effect, the ability to move the resonant frequency of the compensator creates a virtual wideband depicted in FIG. 12. This is verified through simulation where a variable frequency grid is applied and the grid frequency is fed to the compensator. The result is captured in FIG. 13 where the grid current reference signal is accurately tracked throughout the frequency range. In this figure DPF represents the Displacement Power Factor.

Digital implementation of the APR current controller requires the discretization of the system at the predetermined sampling period, $T_s$. Also required is the conversion of the controller to a fixed-point numerical representation. Fixed-point systems are prone to carry forward numerical errors due to the round-off and approximations of complex operators. A technique to maintain the numerical accuracy is presented below.

The conversion from a continuous-time function to a discrete-time equivalent function is carried out through an approximation of the Laplacian variable s in the z– domain (s→z). Using Tustin's method, the dynamics of the original function are accurately preserved for the intended frequency range. The (s→z) conversion implemented is given by equation (16).

$$s = \frac{2}{T_s}\frac{z-1}{z+1} \quad (16)$$

The z-domain equivalent of the continuous-time transfer function of the R-controller given by equation (17) is presented below, and is then further simplified in equation (18).

$$H(s \to z) = \frac{\frac{2}{T_s}\frac{z-1}{z+1}}{\left(\frac{2}{T_s}\frac{z-1}{z+1}\right)^2 + \omega_n^2} \quad (17)$$

$$H(z) = \frac{\frac{2T_s}{T_s^2\omega_n^2+4}\cdot(1-z)^2}{1+\left(\frac{2T_s^2\omega_n^2-8}{T_s^2\omega_n^2+4}\right)\cdot z^{-1}+z^{-2}} \quad (18)$$

The canonical form of an equation in the z-domain is given by equation (19). If equation (18) is fitted to the canonical form, then equation (20) can be used to describe the system. In equation (20), the key coefficients $b_0$, $b_2$, are described by equation (21) and coefficient $a_1$ is described by equation (22). As can be seen, the coefficients are provided in terms of the sampling period $T_s$ and the estimated frequency $\omega_n$. The implementation is presented as a block diagram in FIG. 14.

$$H(z) = \frac{b_0 + b_1 z^{-1} + b_2 z^{-2} + \ldots + b_n z^{-n}}{1 + a_1 z^{-1} + a_2 z^{-2} + \ldots + a_n z^{-n}} \quad (19)$$

$$H(z) = \frac{b_0(1-z^2)}{1+a_1 z^{-1}+z^{-2}} \quad (20)$$

$$b_0 = -b_2 = \frac{2T}{T_s^2\omega_n^2+4} \quad (21)$$

$$a_1 = \frac{2T_s^2\omega_n^2-8}{T_s^2\omega_n^2+4} \quad (22)$$

Figure 14:
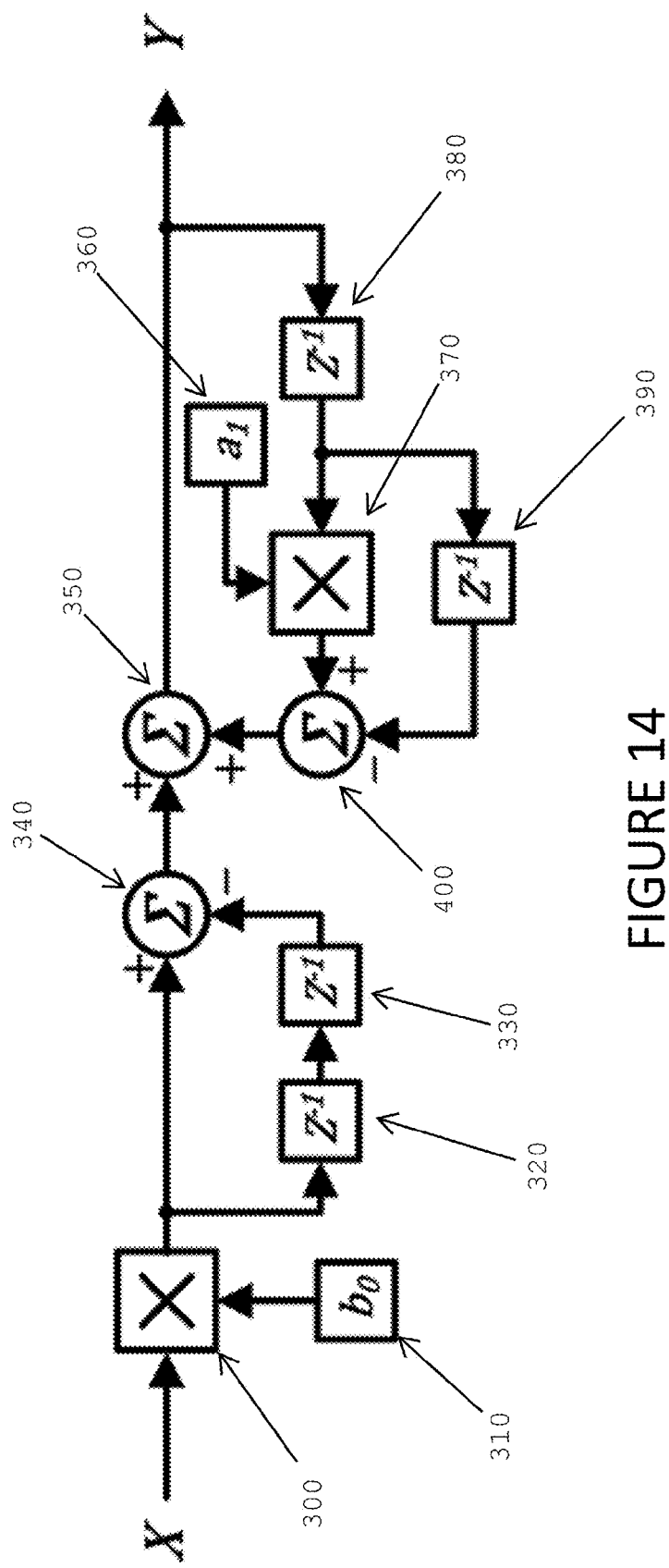
FIG. 14 is a block diagram of an implementation of a proportional resonant structure according to one aspect of the invention.

In FIG. 14, the input X is multiplied by multiplier block 300 with the coefficient $b_0$ from coefficient block 310. The result is then passed through two $z^{-1}$ blocks 320, 330 and the result of these two blocks is subtracted from the result of the multiplier block 300 by way of summation block 340. The result of summation block 340 is added by summation block 350 to the result of summation block 400. The coefficient $a_1$ from coefficient block 360 is multiplied by multiplier block 370 to the result of $z^{-1}$ block 380. This block 380 applies the $z^{-1}$ transform to the output Y. The result of block 380 is again passed through another $z^{-1}$ block 390. The result of block 390 is then subtracted from the result of multiplier block 390 by summation block 400. The output of the subsystem in FIG. 14, when applied to the invention, is the duty cycle prior to applying the system feedback K·X.

The coefficients $a_1$ and $b_0$ are presented in Table 1 for the fundamental frequency and odd harmonics up to the ninth. A sampling period ($T_s$) of 40 µs (25 kHz) was used in the calculations. For these calculations, the fundamental frequency values are based on $\omega_n=2\pi\cdot60$ rad/s and lower harmonics.

TABLE 1

| Frequency | b0 | a1 |
|---|---|---|
| $\omega_n$ | 1.999886308620532e−05 | −1.999772617241063 |
| $3 \cdot \omega_n$ | 1.998977242699539e−05 | −1.997954485399078 |
| $5 \cdot \omega_n$ | 1.997161587949072e−05 | −1.994323175898145 |
| $7 \cdot \omega_n$ | 1.994444281700713e−05 | −1.988888563401425 |
| $9 \cdot \omega_n$ | 1.990832688036796e−05 | −1.981665376073591 |

The difficulty in achieving high precision using a fixed-point system is further complicated by the extremely small differences between coefficients with respect to $\hat{\omega}$. Referring to Table 1, the difference between the fundamental and $9^{th}$ harmonic for coefficient $b_0$ and $a_1$ is 0.45% and 0.91%, respectively. This difference can easily become lost in arithmetic sizing rules and forced truncations.

Figure 15:
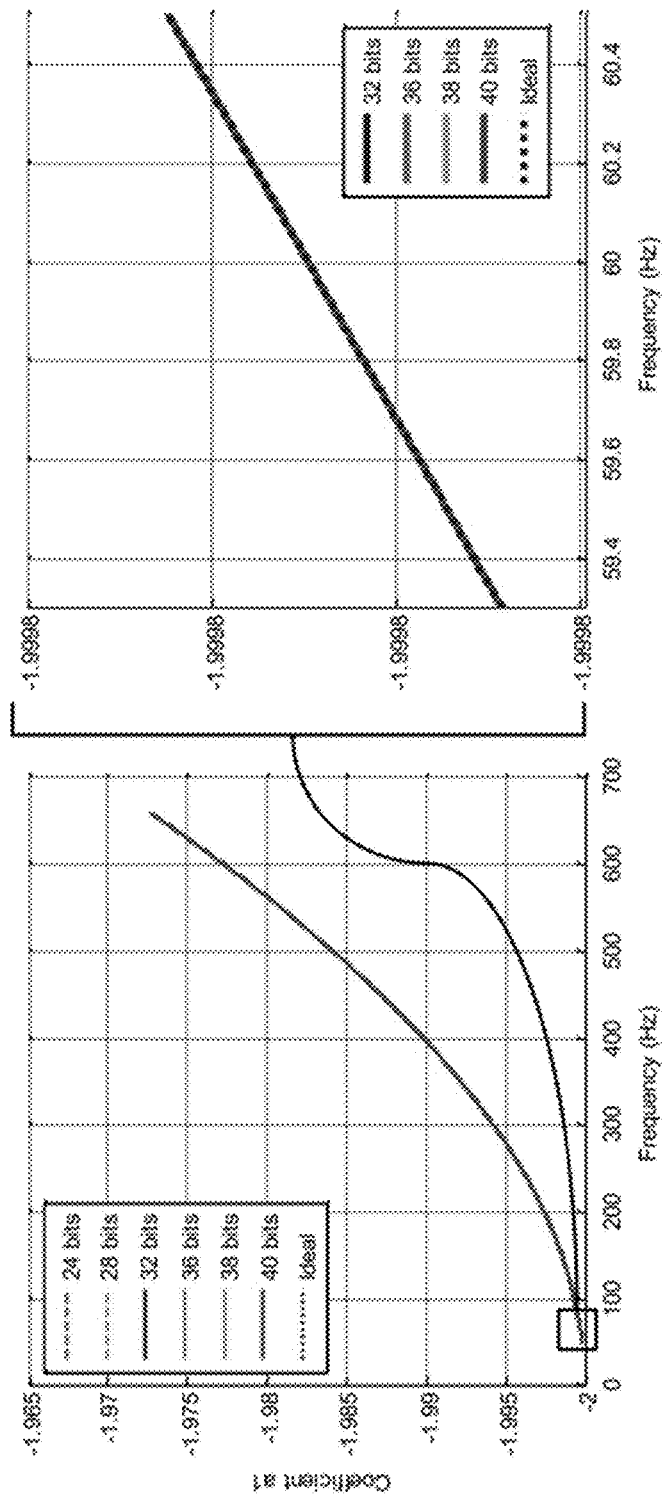
FIGS. 15 and 16 show the fixed point calculation results for coefficients $a_1$ and $b_0$ including a magnified view of a portion of the main graph.
Figure 16:
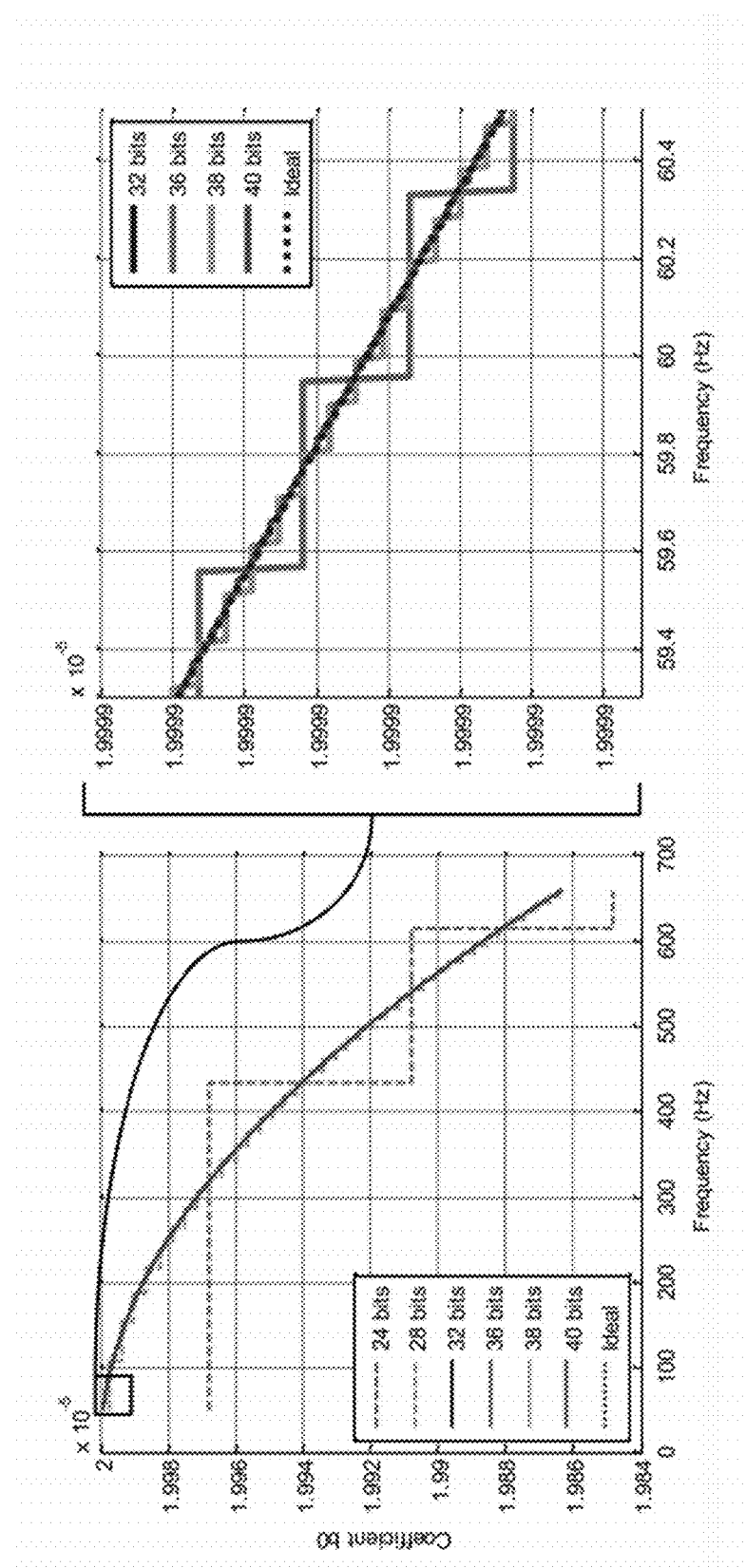

FIG. 15 and FIG. 16 show the fixed-point calculation results of coefficient $a_1$ and $b_0$, respectively. A fixed-point vector with a varying number of fractional bits is used to calculate the coefficients across the lower-harmonic frequency spectrum and compared to the proper floating-point result. The fixed-point calculations are carried out using MATLAB's Fixed-Point Toolbox. The fixed-point calculation deviation from the floating-point reference for coefficient $a_1$ is captured in FIG. 15, and coefficient $b_0$ is shown in FIG. 16. The effect of fixed-point arithmetic on coefficient $a_1$ is very minor whereas $b_0$ displays poor tolerance, evident by the large discontinuities for vectors with less than 40 fractional bits.

In one implementation, the coefficients can be pre-calculated to an acceptable precision and these coefficient values can be stored in a look-up table within the control system. These coefficients can then be accessed by the control system as necessary.

Figure 17:
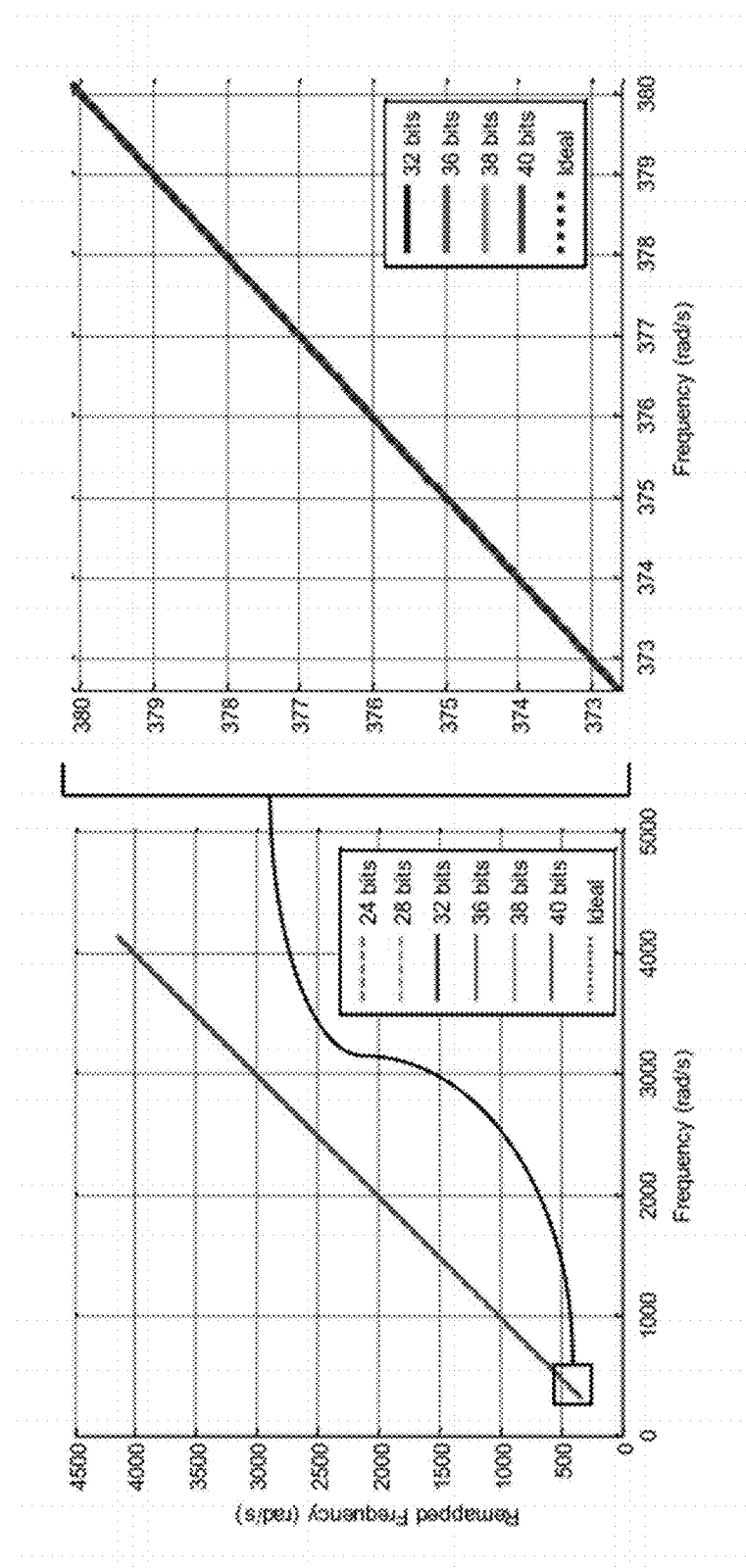
FIG. 17 depicts the remapping of coefficient $a_1$ back to the value of $\omega$ that it represents.
Figure 18:
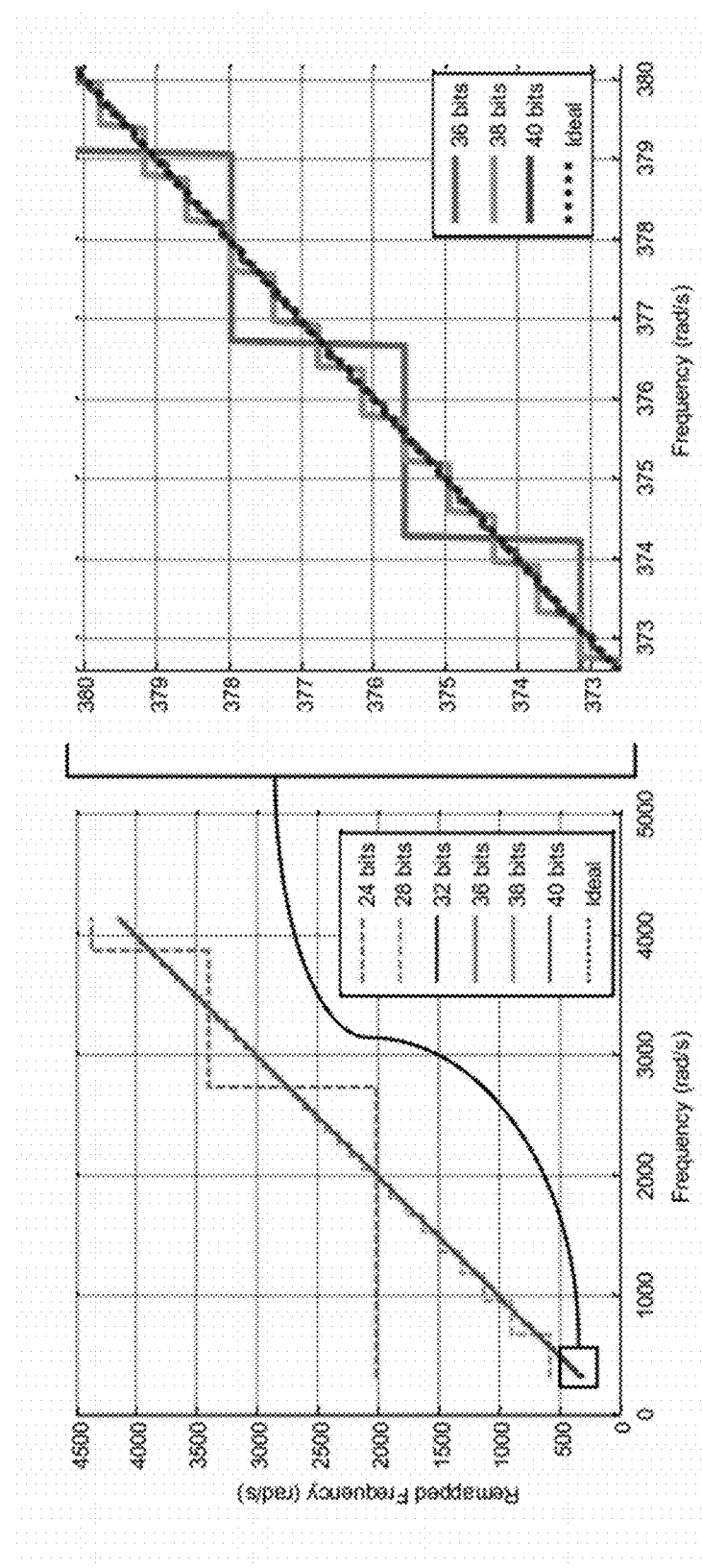
FIG. 18 depicts the remapping of coefficient $b_0$ back to the value of $\omega$ that it represents.

To emphasize the sensitivity to numerical precision, the coefficients $a_1$ and $b_0$ obtained in FIGS. 15 and 16 were re-mapped back to the value of ω they represent. FIG. 17 depicts the remapping of coefficient $a_1$ and FIG. 18 depicts $b_0$. While the slope of $a_1$ follows the desired 1:1 ratio, $b_0$ demonstrates severe discontinuities. A new perspective can be gained by how coarse of a tuning even 38 bits provides and that 40 bits is the minimum for a relatively continuous calculation result.

Calculation of the discrete approximation coefficients $a_1$ and $b_0$ in fixed-point arithmetic is required to be very accurate, efficient, and consistent with models. A first-order approximation limits the computational load to a single multiplication and addition operation, minimizing the propagation of arithmetic error and complexity of implementation.

One option would be to use a discrete approximation which involves a linearisation method. In one implementation of the invention, this is applied to the equations governing the coefficients detailed in equations (22) and (21). Linearisation is performed using a least-squares method to determine the best polynomial fit between the input data and output data. The fitting process is performed at the fundamental and odd-harmonic frequencies. The fundamental frequency (a) is used as the input data for the fitting process rather than the actual corresponding frequency. This avoids an additional multiplication operation by lumping in the multiplication of the frequency estimate and the harmonic multiple (h·ω̂) into the fitting process. Therefore, coefficients $a_1$ and $b_0$ can be approximated by equations (23) and (24) respectively. When using these equations, $\hat{a}_{1,h}$ and $\hat{b}_{0,h}$ represent the approximated coefficients for the $h^{th}$ harmonic. The slope of the approximation profiles are represented by $m_{a_1,h}$ and $m_{b_0,h}$, and the constants of the profiles are $b_{a_1,h}$ $b_{b_0,h}$.

$$\hat{a}_{1,h}(\omega) = \hat{\omega} \cdot m_{a_1,h} + b_{a_1,h} \quad (23)$$

$$\hat{b}_{0,h}(\omega) = \hat{\omega} \cdot m_{b_0,h} + b_{b_0,h} \quad (24)$$

Figure 19:
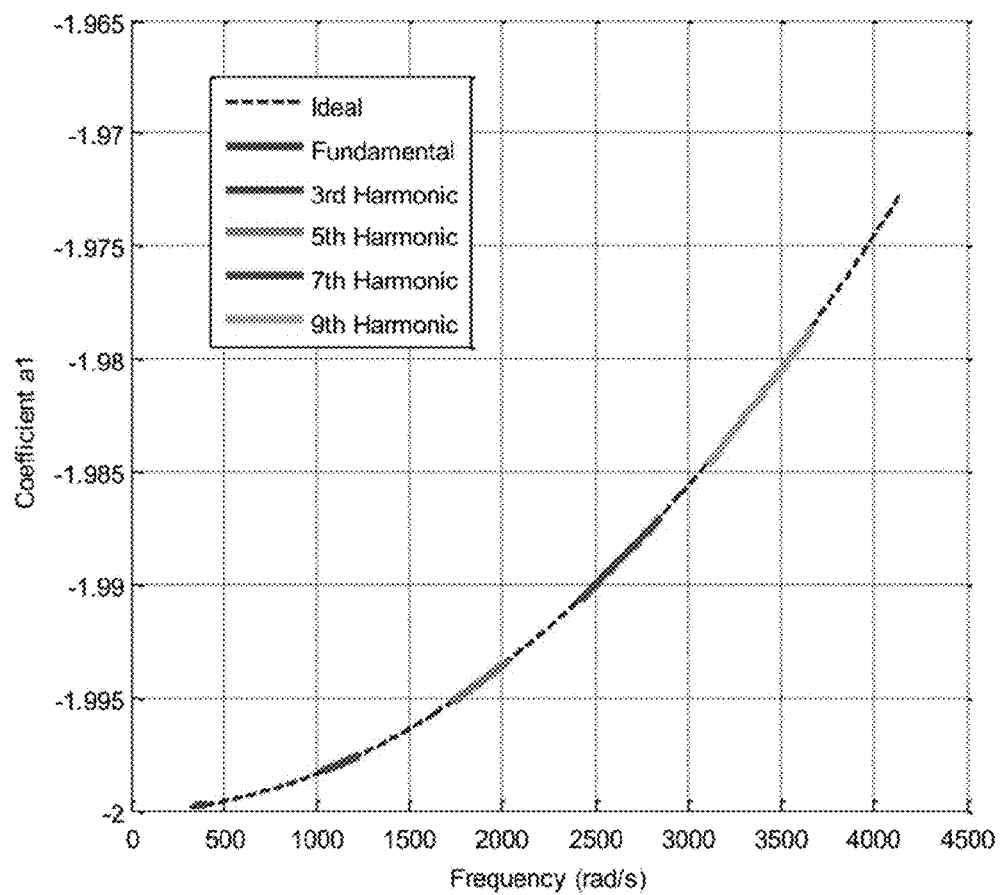
FIGS. 19 and 20 show the end result of the linear fittings for the fundamental frequency as well as the odd harmonics from the third to ninth harmonics of the frequency.
Figure 20:
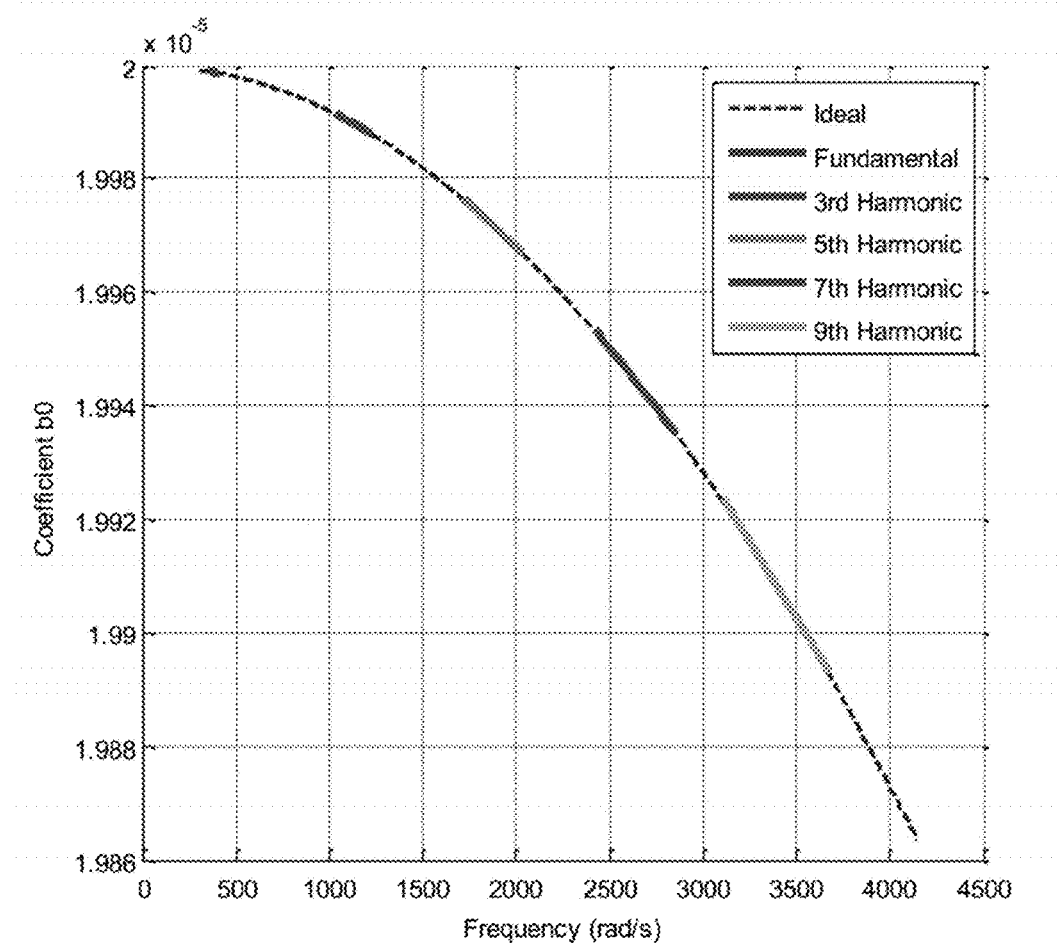

FIGS. 19 and 20 show the end result of the linear fittings for the fundamental frequency as well as the odd harmonics from the third to the ninth harmonics.

It is clear from FIG. 19 and FIG. 20 that the method appears effective. It can be observed that the linearisation for the grid frequency range of 59.3-60.5 Hz (372.6-380.1 rad/s) is very effective for the fundamental frequency and continues to be a good fit outside of those limits.

Figure 21:
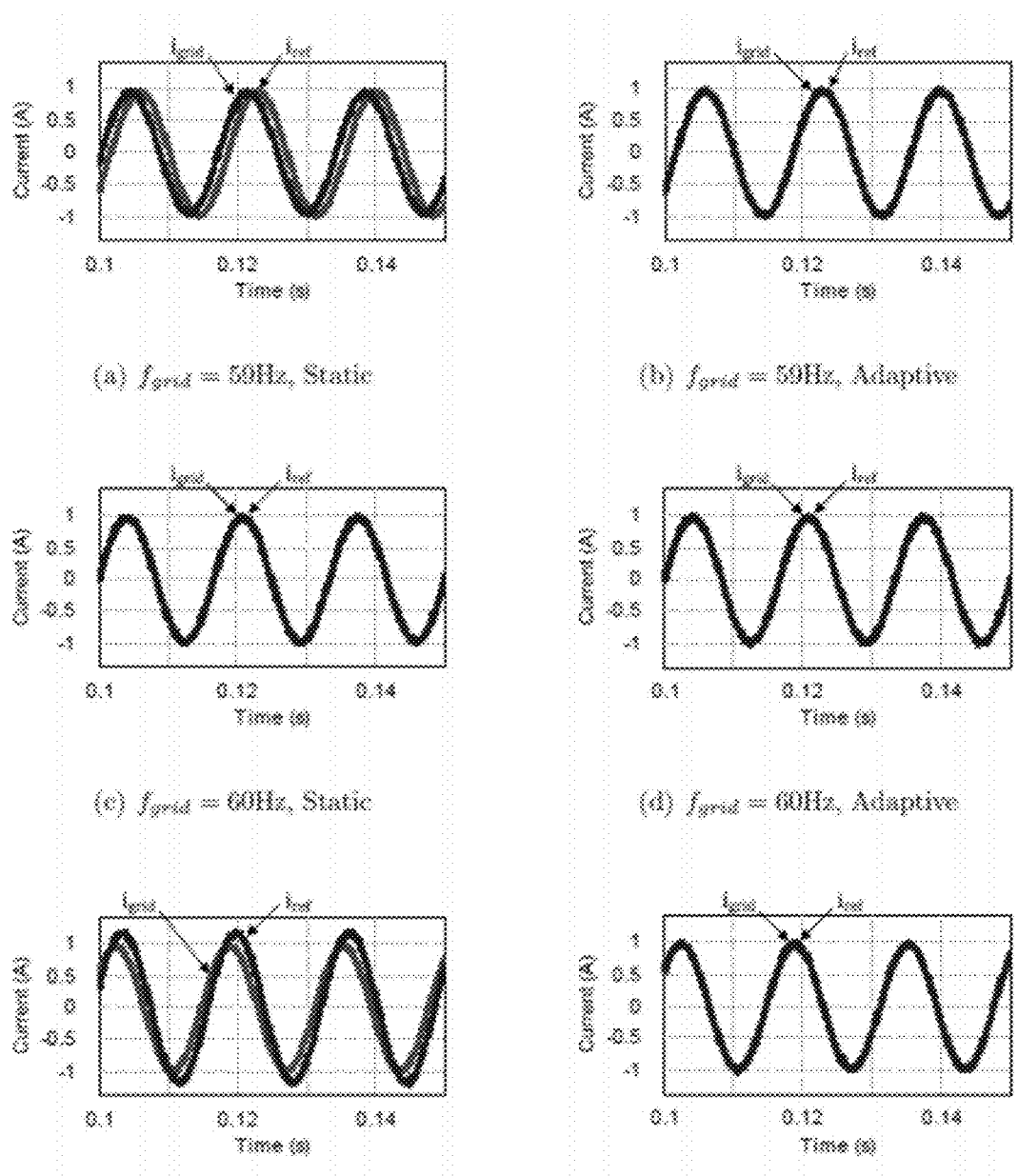
FIG. 21 illustrates the performance comparison between the APR current controller according to the present invention and a static PR controller.

The simulations were conducted twice at three frequencies which cover the IEEE1547 interconnection range: 59 Hz, 60 Hz, and 61 Hz. The simulations were conducted once with the APR current controller and once with a static PR controller tuned to 60 Hz. FIG. 21 shows the performance comparison. At a grid frequency of 60 Hz, both the static system are in phase-lock. However, outside of the 60 Hz range the static system begins to show the characteristic phase-lead for a 59 Hz grid and phase-lag for a 61 Hz grid. With the APR current controller, no phase mismatch is observed for either the 59 Hz grid frequency or the 61 Hz grid frequency.

In order to evaluate the techniques of the invention, a single-phase grid-connected voltage source inverter prototype was prepared. The converter parameters are given in Table 2. The voltage source inverter is connected to the grid through an LCL filter.

TABLE 2

Converter Specifications

| Symbol | Parameter | Value |
| --- | --- | --- |
| $P_o$ | Output Power | 1 kW |
| $V_o$ | Output Voltage | 85-264 $V_{RMS}$ |
| $V_{dc}$ | Input Voltage | 400-450 V |
| $f_{sw}$ | Switching Frequency | 25 kHz |
| $C_{BUS}$ | DC Bus Capacitance | 782 μF |
| $L_1$ | Inverter Side Inductor | 2.6 mH |
| $L_2$ | Grid-Side Inductance | 310 μH |
| $C_f$ | Filter Shunt Capacitance | 5 μF |

In order to quantify the steady-state performance of the APR current controller versus the static PR controller, the grid frequency ($f_{grid}$) was varied and the Power Factor (PF) and Total Harmonic Distortion (THD) measurements were taken.

Figure 22:
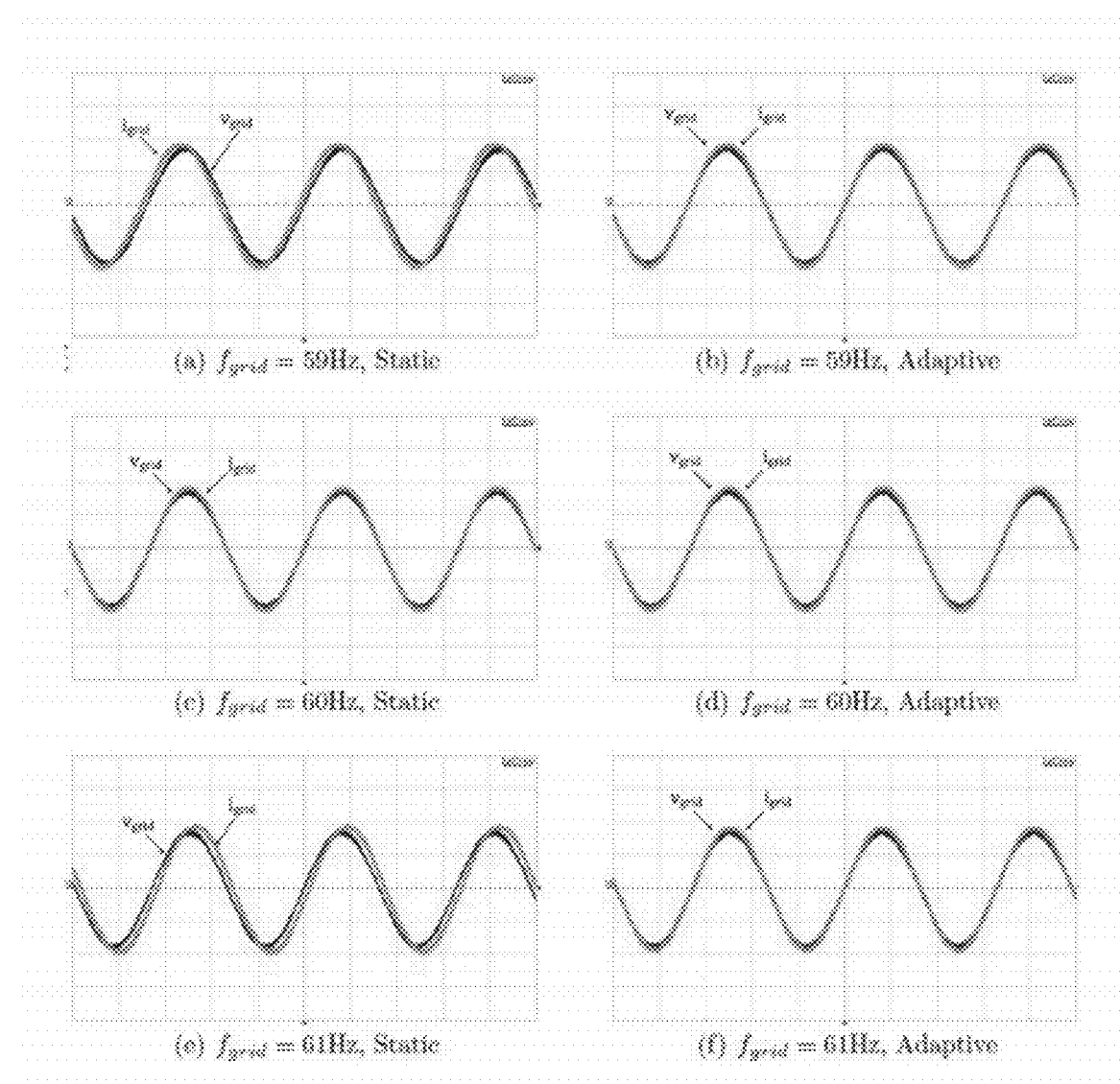
FIG. 22 depicts the grid current for a range of frequencies of 59-61 Hz for both static and adaptive control systems when the two systems were compared.

FIG. 22 depicts the grid current for a range of frequencies of 59-61 Hz for both static and adaptive control systems. At the nominal frequency of $f_{grid}$, 60 Hz, both the PR systems demonstrated the ability to remain in phase with grid voltage. When $f_{grid}$ is reduced to 59 Hz, the PR controller generates a leading $i_{grid}$ when compared to the APR system which remains in-phase. An increase in $f_{grid}$ to 61 Hz reveals a lagging $i_{grid}$ for the PR controller and a seemingly unchanged, in-phase grid current for the APR system. While the PF remains at 1.0, for the APR system, the PF measurements reduce to 0.982 and 0.973 for the PR controller at the 59 Hz and 61 Hz frequencies respectively.

Figure 23:
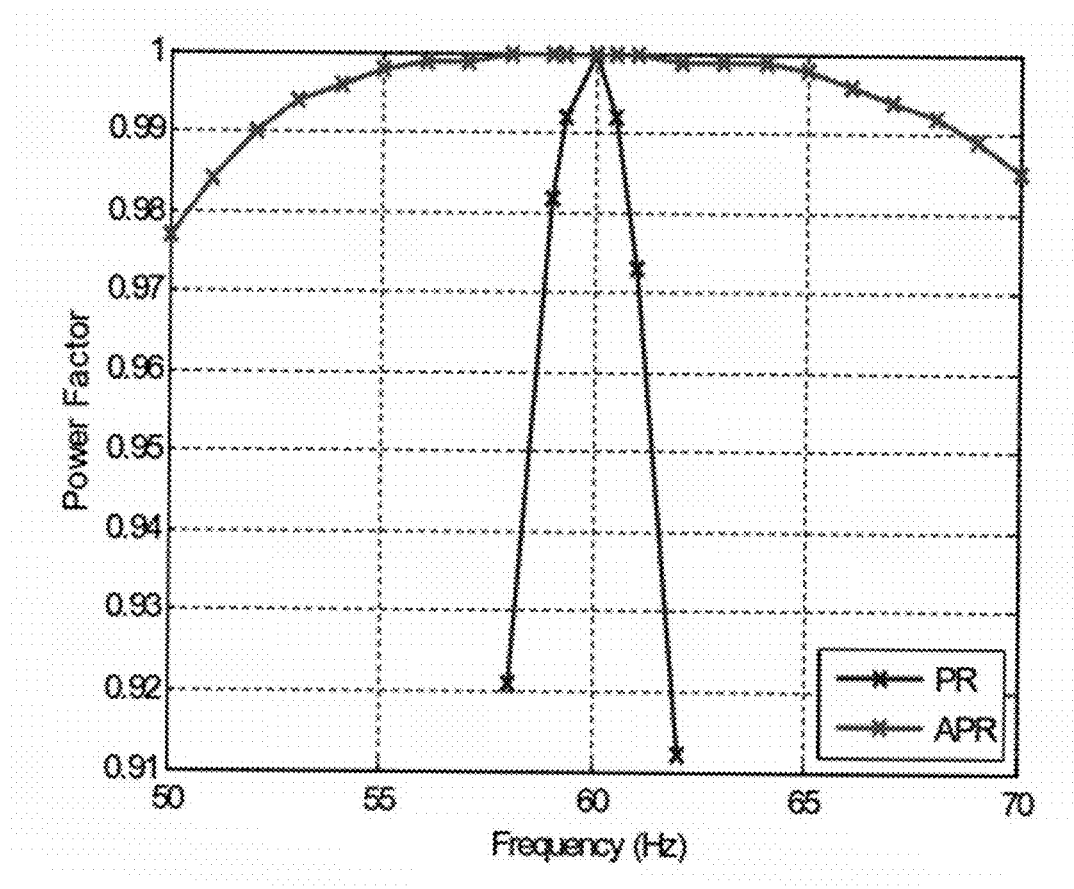
FIG. 23 illustrates a plot of the power factor for the proportional resonant and adaptive proportional resonant systems.
Figure 24:
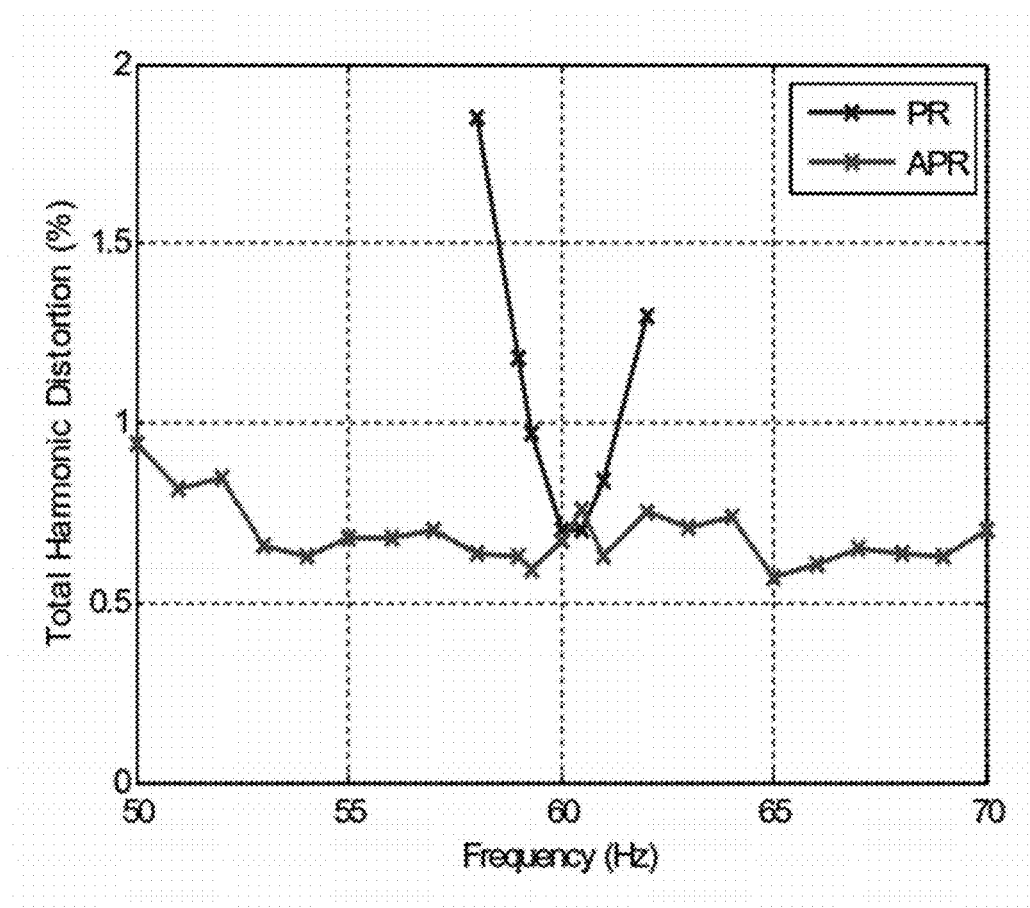
FIG. 24 illustrates THD (total harmonic distortion) for the proportional resonant and adaptive proportional resonant systems.

A plot of the PF for both the PR and APR system is depicted in FIG. 23. It is clear that once $f_{grid}$ deviates from the nominal frequency, a steep decline in power quality is experienced. With the APR system, a very flat response is experienced with a more gradual roll-off in power quality. These characteristics are also reflected in the THD measurements in FIG. 24. A very small increase in distortion is seen for the APR system, indicating the harmonic compensator are able to suppress their respective harmonics. The PR controller's static harmonic compensator cannot adequately remove their respective harmonic content because the $f_{grid}$ deviation is magnified with every harmonic, resulting in a phase-shifted harmonic rather than cancellation.

Figure 25:
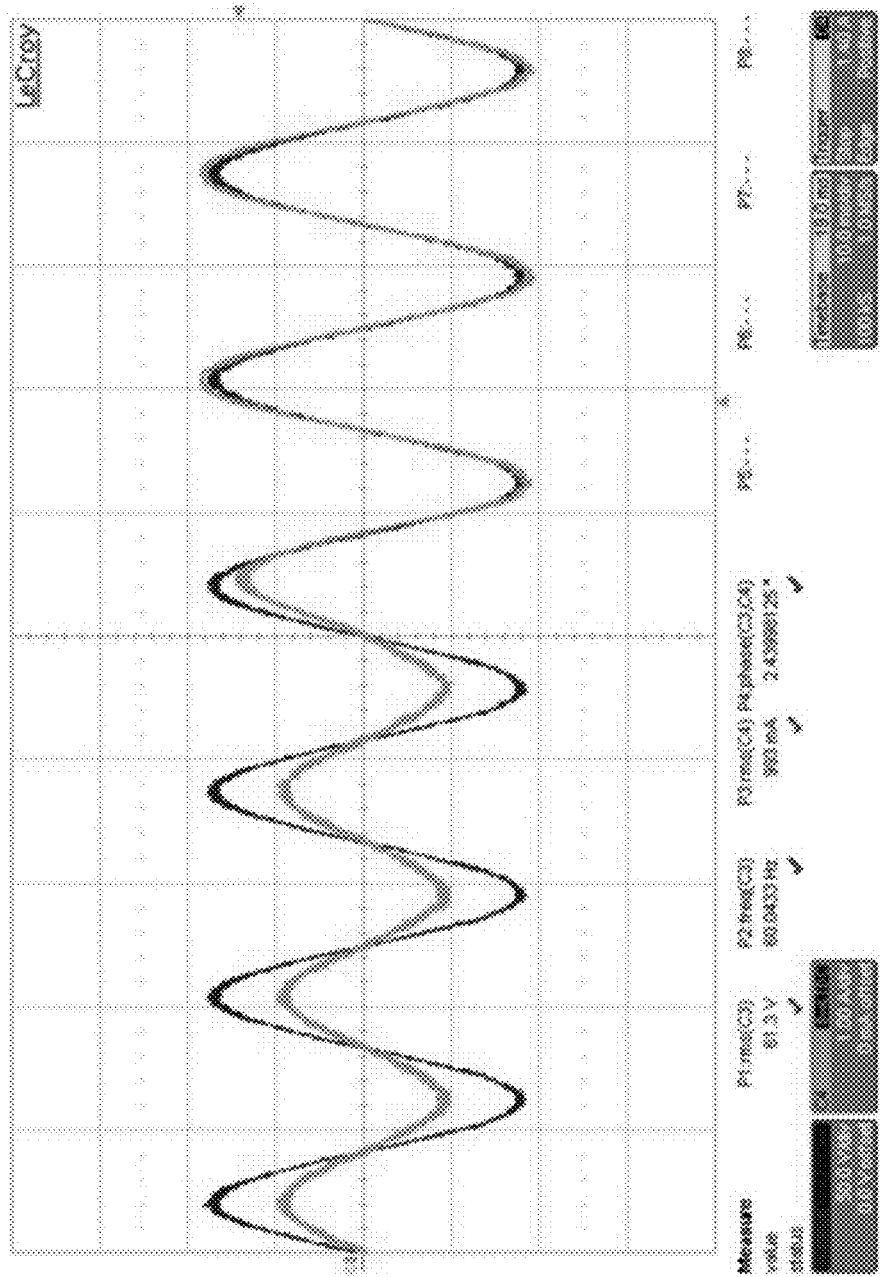
FIG. 25 shows the APR controller's response to a step increase in the reference magnitude.
Figure 26:
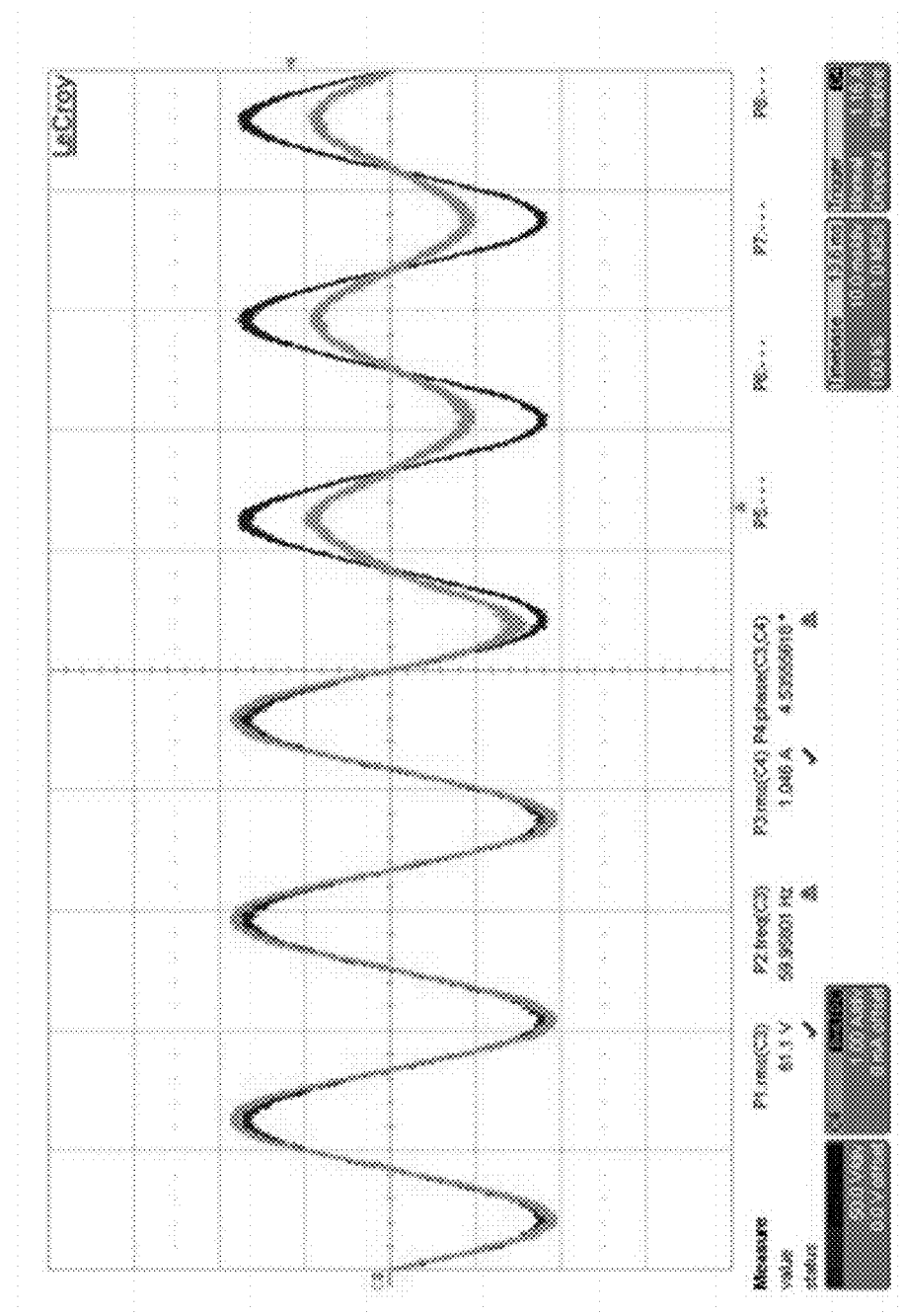
FIG. 26 shows the APR controller's response to a step decrease in the reference magnitude.

The controller is influenced by two parameters, the current reference magnitude and the frequency. In order to examine the response of the controller according to the present invention, a step increase in the reference magnitude from 0.7 $A_{RMS}$, to 1.4 $A_{RMS}$, is applied, as well as a return to 0.7 $A_{RMS}$. The response of the step-increase is captured in FIG. 25 and the step-decrease in FIG. 26. The response of $i_{grid}$ indicates steady-state is reached at half a line-cycle (8.3 ms) for the step-down and much faster for the step-up condition requiring only 6 ms.

Figure 27:
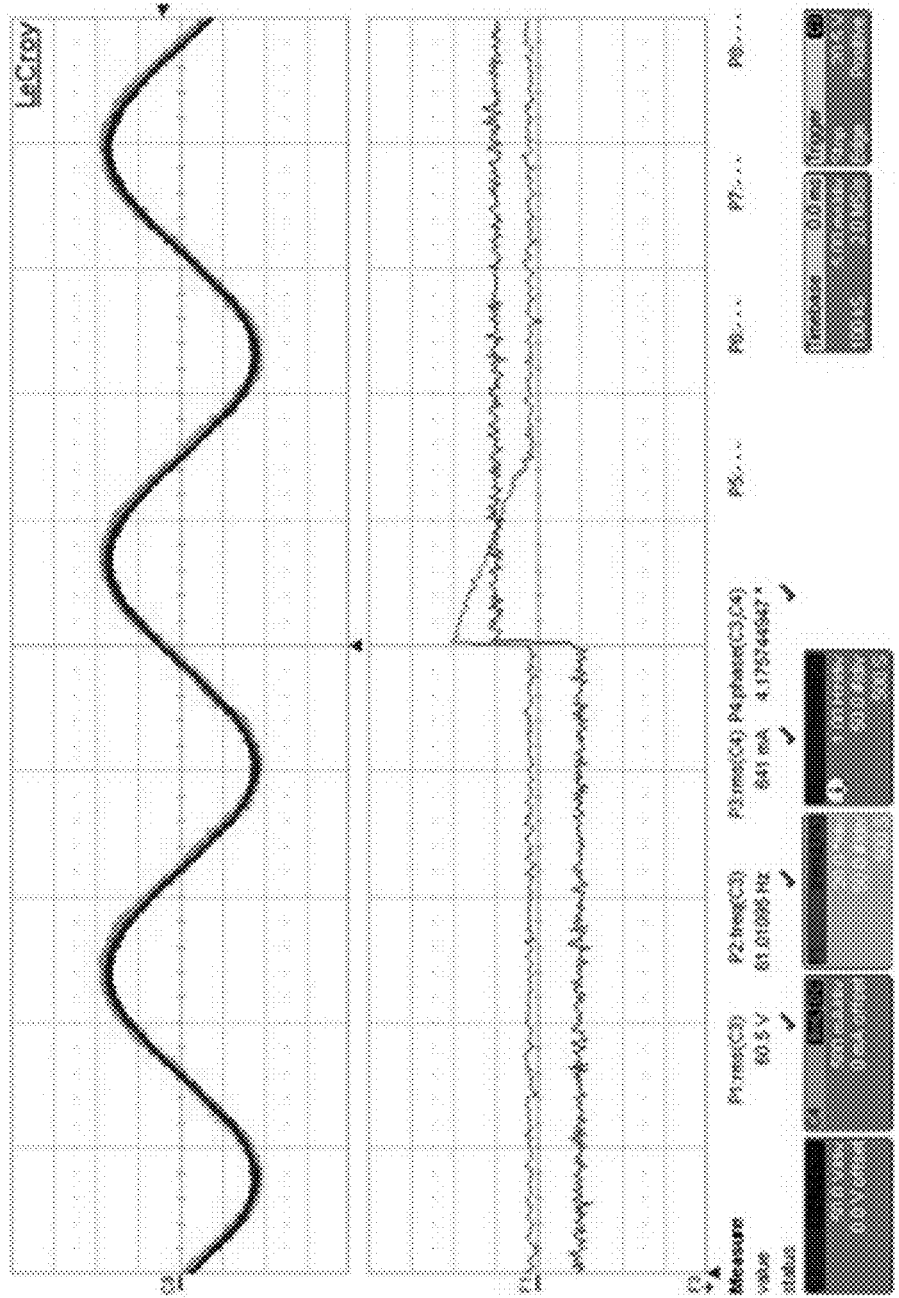
FIG. 27 shows the response of the APR controller to a step increase in the grid frequency.
Figure 28:
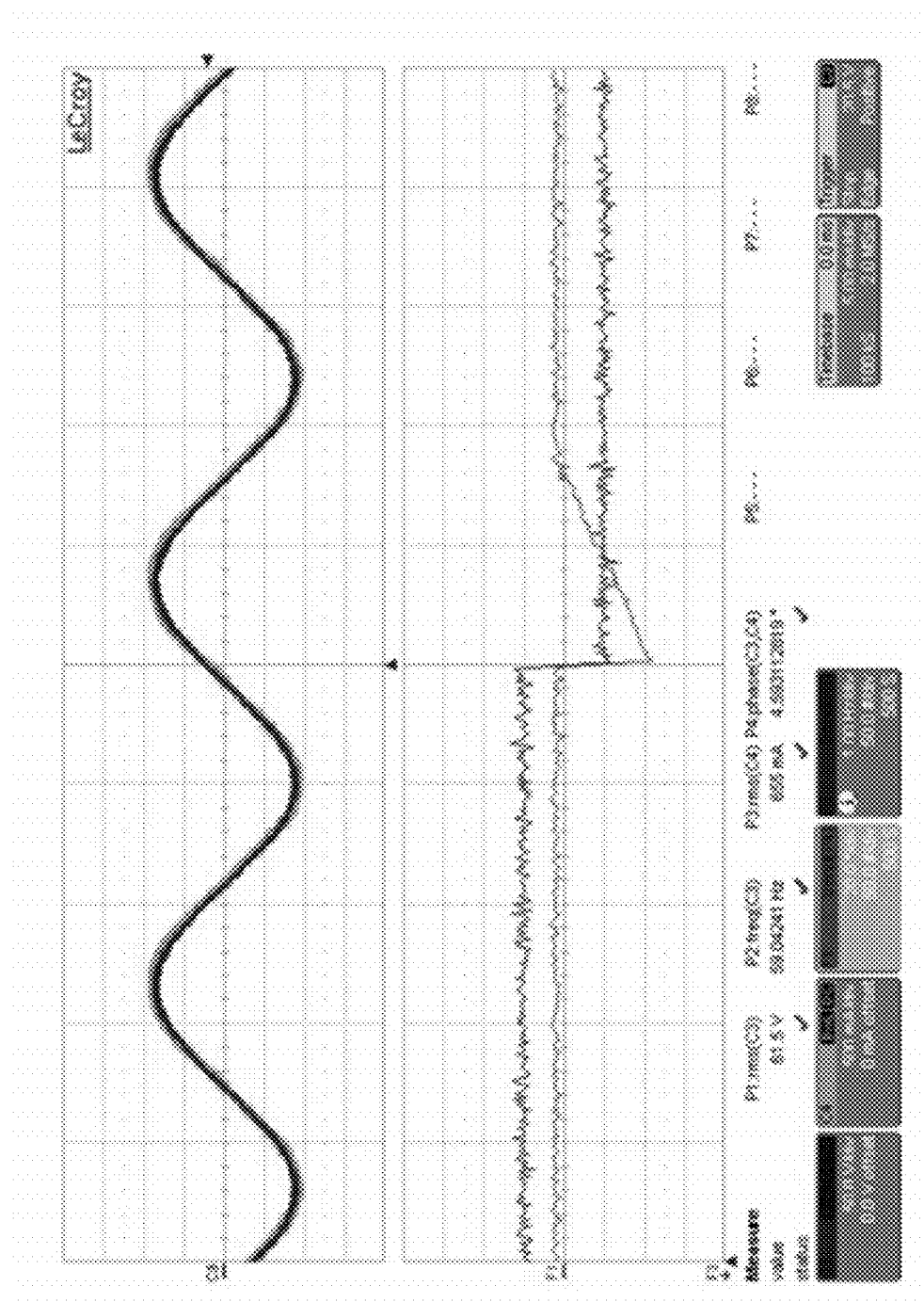
FIG. 28 shows the response of the APR controller to a step decrease in the grid frequency.

In order to examine the response of the APR current controller as the grid frequency changes, the phase error between the grid voltage and the current is measured. A step-change between 59 Hz and 61 Hz is applied in both up and down directions. The step-increase is depicted in FIG. 27 and the step-decrease is given in FIG. 28. It can be noted that, as soon as the transient occurs, a sharp increase in phase error also occurs. The phase error follows a constant slope until the system returns to pre-transient levels of 4 degrees of difference. Recall that the AANF used to identify the frequency requires only two line-cycles to reach steady-state after such a transient. The length of the reaction is attributed to the Moving Average Filter (MAF) for ripple reduction.

It should be noted that the adaptive current controller according to one aspect of the invention may be implemented as an application specific IC (ASIC). Alternatively, the system may be implemented as a general purpose data processing device equipped with suitable input/output interfaces to send and receive the relevant signals to and from the rest of the system including the inverter. Such a data processing device may be useful for the calculations which may be required by such an implementation of the invention.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A control system for controlling an inverter, the system comprising:
   a parameter identification block for receiving sensed signal values from an inverter and for estimating values for components within said inverter based on said sensed signal values;
   a current controller block for receiving a reference current signal and an estimated frequency signal and for determining a desired gain for said inverter;
   wherein
   said desired gain enhances a stability of said control system;
   said inverter comprises an LCL filter, said values for said components comprising values for inductors and capacitors in said LCL filter;
   said desired gain for said inverter is controlled by controlling a duty cycle for said inverter;
   said desired gain is based on an estimated frequency signal ($\hat{w}$), a sampling period ($T_s$), and a first coefficient ($a_1$) and a second coefficient ($b_0$); and
   said first and second coefficients are calculated based on:

$$b_0 = -b_2 = \frac{2T}{T_s^2 \omega_n^2 + 4}$$

$$a_1 = \frac{2T_s^2 \omega_n^2 - 8}{T_s^2 \omega_n^2 + 4}.$$

2. The control system according to claim 1, wherein said inverter is a full inverter.

3. The control system according to claim 1, wherein said inverter is coupled to a power grid.

4. The control system according to claim 1, wherein said inverter receives power from a distributed power generation source, said power being for conversion into power suitable for insertion into a power grid.

5. The control system according to claim 1, wherein said current controller block receives said estimated frequency signal from a grid synchronization block, said grid synchronization block being for ensuring that said estimated frequency signal is accurately tracked by a grid current $i_{grid}$.

6. The control system according to claim 1, wherein said sensed values include at least one of:
   a DC input voltage to said inverter;
   an inverter current;
   a voltage across a capacitor in said inverter; and
   a current of a power grid to which said inverter is coupled.

7. The control system according to claim 1, wherein said first and second coefficients are approximated according to:

$$\hat{a}_{1,h}(\omega) = \hat{\omega} \cdot m_{a_1,h} + b_{a_1,h}$$

$$\hat{b}_{0,h}(\omega) = \hat{\omega} \cdot m_{b_0,h} + b_{b_0,h}$$

where $\hat{a}_{1,h}$ and $\hat{b}_{0,h}$ represent approximated coefficients for an $h^{th}$ harmonic of said estimated frequency, a slope of approximation profiles for said coefficients are represented by $m_{a_1,h}$ and $m_{b_0,h}$, and constants of the profiles are $b_{a_1,h}$, $b_{b_0,h}$.

8. A control system for controlling an inverter, the system comprising:
- a parameter identification block for receiving sensed signal values from an inverter and for estimating values for components within said inverter based on said sensed signal values;
- a current controller block for receiving a reference current signal and an estimated frequency signal and for determining a desired gain for said inverter;

wherein said desired gain enhances a stability of said control system;

said inverter comprises an LCL filter, said values for said components comprising values for inductors and capacitors in said LCL filter;

wherein said parameter identification block estimates said values for said components based on:

$$\dot{\hat{\theta}}_1 = \mu_1 \tilde{x}_1$$

$$\dot{\hat{\theta}}_2 = \mu_2 \tilde{x}_2 (x_1 u - x_3)$$

$$\dot{\hat{\theta}}_3 = \mu_3 \tilde{x}_4 (x_3 - v_{grid})$$

$$\dot{\hat{\theta}}_4 = \mu_4 \tilde{x}_3 (x_2 - x_4)$$

where $$X = \begin{bmatrix} x_1 \\ x_2 \\ x_3 \\ x_4 \end{bmatrix} = \begin{bmatrix} v_{DC} \\ i_{inv} \\ v_{cap} \\ i_{grid} \end{bmatrix}$$

$$\begin{bmatrix} \theta_1 \\ \theta_2 \\ \theta_3 \\ \theta_4 \end{bmatrix} = \begin{bmatrix} I_{DC} \\ \frac{1}{L_1} \\ \frac{1}{L_2} \\ \frac{1}{C_f} \end{bmatrix}$$

and $L_1$ is an inductance of an inverter-side inductor of said LCL filter;

$L_2$ is an inductance of a grid-side inductor of said LCL filter;

$C_f$ is a capacitance of a capacitor of said LCL filter;

$I_{DC}$ is an input DC current;

$v_{DC}$ is a DC input voltage to said inverter;

$i_{inv}$ is an inverter current;

$c_{cap}$ is a voltage across said capacitor; and $i_{grid}$ is a current of a power grid to which said inverter is coupled.

9. A method for enhancing a stability of a control system for an inverter, the method comprising:
- a) receiving sensed values from said inverter;
- b) estimating parameters for components in said inverter based on said sensed values;
- c) estimating an estimated frequency for a grid to which said inverter is coupled;
- d) adjusting a gain of said inverter based on said estimated frequency and said parameters estimated in step b);

wherein said inverter comprises an LCL filter;

said parameters include parameters for components in said LCL filter;

said parameters include inductances of inductors in said LCL filter and capacitance for a capacitor in said LCL filter;

said parameters are estimated based on:

$$\dot{\hat{\theta}}_1 = \mu_1 \tilde{x}_1$$

$$\dot{\hat{\theta}}_2 = \mu_2 \tilde{x}_2 (x_1 u - x_3)$$

$$\dot{\hat{\theta}}_3 = \mu_3 \tilde{x}_4 (x_3 - v_{grid})$$

$$\dot{\hat{\theta}}_4 = \mu_4 \tilde{x}_3 (x_2 - x_4)$$

where $$X = \begin{bmatrix} x_1 \\ x_2 \\ x_3 \\ x_4 \end{bmatrix} = \begin{bmatrix} v_{DC} \\ i_{inv} \\ v_{cap} \\ i_{grid} \end{bmatrix}$$

$$\begin{bmatrix} \theta_1 \\ \theta_2 \\ \theta_3 \\ \theta_4 \end{bmatrix} = \begin{bmatrix} I_{DC} \\ \frac{1}{L_1} \\ \frac{1}{L_2} \\ \frac{1}{C_f} \end{bmatrix}$$

and $L_1$ is an inductance of an inverter-side inductor of said LCL filter;

$L_2$ is an inductance of a grid-side inductor of said LCL filter;

$C_f$ is a capacitance of a capacitor of said LCL filter;

$I_{DC}$ is an input DC current;

$v_{DC}$ is a DC input voltage to said inverter;

$i_{inv}$ is an inverter current;

$v_{cap}$ is a voltage across said capacitor; and $i_{grid}$ is a current of a power grid to which said inverter is coupled.

10. The method according to claim 9 wherein said gain is based on an estimated frequency signal ($\hat{\omega}$), a sampling period ($T_s$), and a first coefficient ($a_1$) and a second coefficient ($b_0$).

11. A method according to claim 10 wherein said first and second coefficients are calculated based on:

$$b_0 = -b_2 = \frac{2T}{T_s^2 \omega_n^2 + 4}$$

$$a_1 = \frac{2T_s^2 \omega_n^2 - 8}{T_s^2 \omega_n^2 + 4}.$$

12. A method according to claim 10 wherein said first and second coefficients are approximated according to:

$$\hat{a}_{1,h}(\omega) = \hat{\omega} \cdot m_{a_1,h} + b_{a_1,h}$$

$$\hat{b}_{0,h}(\omega) = \hat{\omega} \cdot m_{b_0,h} + b_{b_0,h}$$

where $\hat{a}_{1,h}$ and $\hat{b}_{0,h}$ represent approximated coefficients for an $h^{th}$ harmonic of said estimated frequency, a slope of approximation profiles for said coefficients are represented by $m_{a_1,h}$ and $m_{b_0,h}$, and constants of the profiles are $b_{a_1,h}$ $b_{b_0,h}$.

* * * * *